United States Patent
Hada et al.

(10) Patent No.: US 11,834,962 B2
(45) Date of Patent: Dec. 5, 2023

(54) TURBINE STATOR VANE, GAS TURBINE, AND METHOD OF PRODUCING TURBINE STATOR VANE

(71) Applicant: Mitsubishi Power, Ltd., Yokohama (JP)

(72) Inventors: Satoshi Hada, Yokohama (JP); Yoshifumi Okajima, Tokyo (JP); Kunihiko Waki, Kakogawa (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 247 days.

(21) Appl. No.: 17/439,273

(22) PCT Filed: Apr. 8, 2020

(86) PCT No.: PCT/JP2020/015829
§ 371 (c)(1),
(2) Date: Mar. 31, 2022

(87) PCT Pub. No.: WO2020/235245
PCT Pub. Date: Nov. 26, 2020

(65) Prior Publication Data
US 2023/0175404 A1    Jun. 8, 2023

(30) Foreign Application Priority Data

May 17, 2019   (JP) ................................. 2019-093360

(51) Int. Cl.
*F01D 5/18* (2006.01)
*F01D 9/02* (2006.01)
(Continued)

(52) U.S. Cl.
CPC .............. *F01D 5/187* (2013.01); *F01D 9/023* (2013.01); *F01D 9/041* (2013.01); *F02C 7/18* (2013.01);
(Continued)

(58) Field of Classification Search
CPC .............................. F01D 9/042; F05D 2240/81
See application file for complete search history.

(56) References Cited

U.S. PATENT DOCUMENTS

| | | | |
|---|---|---|---|
| 6,984,101 B2 * | 1/2006 | Schiavo, Jr. | ............ F01D 5/187 415/115 |
| 8,851,845 B2 * | 10/2014 | Brittingham | ............ F01D 5/187 416/193 A |

(Continued)

FOREIGN PATENT DOCUMENTS

| | | |
|---|---|---|
| JP | 2004-60638 | 2/2004 |
| JP | 2009-162227 | 7/2009 |

(Continued)

OTHER PUBLICATIONS

International Search Report dated Jun. 16, 2020 in International (PCT) Application No. PCT/JP2020/015829.

*Primary Examiner* — Courtney D Heinle
*Assistant Examiner* — Danielle M. Christensen
(74) *Attorney, Agent, or Firm* — Wenderoth, Lind & Ponack, L.L.P.

(57) ABSTRACT

A turbine stator vane includes; an airfoil portion; a shroud disposed on at least one of the side of a tip end portion or the side of a root end portion of the airfoil portion; and a protruding portion protruding toward the opposite side to the airfoil portion across a gas path surface in a radial direction. The shroud includes: a circumferential-direction passage disposed at the side of a trailing edge and extending in a circumferential direction; and a plurality of trailing edge end portion passages arranged in the circumferential direction at the side of the trailing edge, each trailing edge end portion passage having a first end portion connected to the circumferential-direction passage and a second end portion having an opening on a trailing edge end surface of the shroud. The circumferential-direction passage includes, in a cross-sec- (Continued)

tional view as seen in the circumferential direction, an oblique passage having a third end portion to protrude closer to the gas path surface toward the side of a leading edge, and a fourth end portion formed at the side of the trailing edge with respect to the third end portion, the oblique passage having an opening portion disposed on a trailing-edge side end surface of the protruding portion and closed by a lid portion, and a position, in an axial direction, of the first end portion where each trailing edge end portion passage connects to the circumferential-direction passage is positioned at the side of the leading edge with respect to a position of the trailing-edge side end surface of the protruding portion at a position where the protruding portion connects to the shroud.

19 Claims, 7 Drawing Sheets

(51) Int. Cl.
*F01D 9/04* (2006.01)
*F02C 7/18* (2006.01)

(52) U.S. Cl.
CPC ...... *F05D 2220/32* (2013.01); *F05D 2240/81* (2013.01); *F05D 2260/201* (2013.01); *F05D 2260/202* (2013.01)

(56) References Cited

U.S. PATENT DOCUMENTS

| | | | |
|---|---|---|---|
| 10,358,927 B2 * | 7/2019 | Okajima | F01D 9/04 |
| 10,605,102 B2 * | 3/2020 | Matsuo | F01D 5/147 |
| 10,989,068 B2 * | 4/2021 | Packer | F01D 25/12 |
| 2004/0018082 A1 | 1/2004 | Soechting et al. | |
| 2009/0165301 A1 | 7/2009 | Broomer et al. | |
| 2019/0032499 A1 | 1/2019 | Matsuo et al. | |

FOREIGN PATENT DOCUMENTS

| | | |
|---|---|---|
| JP | 2018-141393 | 9/2018 |
| WO | 2017/154785 | 9/2017 |

* cited by examiner (UPSTREAM SIDE) ←Da→ (DOWNSTREAM SIDE)

A-A

B-B

C-C

TURBINE STATOR VANE, GAS TURBINE, AND METHOD OF PRODUCING TURBINE STATOR VANE

TECHNICAL FIELD

The present disclosure relates to a turbine stationary vane, a turbine, and a method of producing a turbine stator vane.

BACKGROUND ART

For instance, a turbine stator vane used for a gas turbine or the like is to be exposed to a high-temperature fluid such as combustion gas, and thus has a structure for cooling. For instance, according to the turbine stator vane disclosed in Patent Document 1, the stator vane body (airfoil portion), the inner shroud, and the outer shroud are each cooled with cooling air (see Patent Document 1).

CITATION LIST

Patent Literature

Patent Document 1: JP2018-141393A

SUMMARY

Problems to be Solved

For instance, the inner shroud may include a retainer formed thereon, for fixing the gas turbine stator vane to the casing of the gas turbine, such that the retainer protrudes inward in the radial direction of the gas turbine. The inner retainer is in contact with the cooling air at the radially inner surface, and is cooled by the cooling air. However, at the connection position of the retainer, the retainer exists at the radially inner side of the region, and the cooling effect of the cooling air may decrease in the region at the outer side, in the radial direction, of the connection position and the temperature may become higher compared to the rest of the region.

In view of the above, an object of at least one embodiment of the present invention is to improve the effect to cool a shroud of a turbine stator vane.

Solution to the Problems (1) According to at least one embodiment of the present invention, a turbine stator vane includes: an airfoil portion; a shroud disposed on at least one of the side of a tip end portion or the side of a root end portion of the airfoil portion; and a protruding portion protruding toward the opposite side to the airfoil portion across a gas path surface in a radial direction. The shroud includes: a circumferential-direction passage disposed at the side of a trailing edge and extending in a circumferential direction; and a plurality of trailing edge end portion passages arranged in the circumferential direction at the side of the trailing edge, each trailing edge end portion passage having a first end portion connected to the circumferential-direction passage and a second end portion having an opening on a trailing edge end surface of the shroud. The circumferential-direction passage includes, in a cross-sectional view as seen in the circumferential direction, an oblique passage having a third end portion to protrude closer to the gas path surface toward the side of a leading edge, and a fourth end portion formed at the side of the trailing edge with respect to the third end portion, the oblique passage having an opening portion disposed on a trailing-edge side end surface of the protruding portion and closed by a lid portion. A position, in an axial direction, of the first end portion where each trailing edge end portion passage connects to the circumferential-direction passage is positioned at the side of the leading edge with respect to a position of the trailing-edge side end surface of the protruding portion at a position where the protruding portion connects to the shroud.

For instance, in a case where the shroud is cooled by convective cooling through contact with cooling air on the surface opposite to the gas path surface of the shroud, the region of the shroud proximate to the gas path surface at the connection position of the protruding portion has the protruding portion on the surface opposite to the gas path surface, and thus the cooling effect of the cooling air may decrease, and the region may have a higher temperature than the rest of the region.

With the above configuration (1), the position, in the axial direction, of the first end portion where the trailing edge end portion passage is connected to the circumferential-direction passage is positioned at the side of the leading edge with respect to the position of the trailing-edge side end surface of the protruding portion at the position where the protruding portion connects to the shroud. Thus, it is possible to efficiently cool the region of the shroud close to the gas path surface at the connection position of the protruding portion with the cooling air flowing through the plurality of the trailing edge end portion passages arranged in the circumferential direction at the side of the trailing edge. Accordingly, it is possible to suppress temperature increase of the region compared to the rest of the region, and improve the effect to cool the shroud of the turbine stator vane.

Furthermore, with the above configuration (1), the oblique passage included in the circumferential-direction passage has the opening portion on the trailing-edge side end surface of the protruding portion. Furthermore, the oblique passage has, in a cross-sectional view in the circumferential direction, the third end portion protruding closer to the gas path surface toward the leading edge, and the fourth end portion formed at the side of the trailing edge with respect to the third end portion. Thus, for instance, in a case where the turbine stator vane having the above configuration (1) is to be produced by casting, it is possible to form the opening portion on the trailing-edge side end surface of the protruding portion and at least a part of the oblique passage connecting to the opening portion easily at the time of casting the turbine stator vane. Accordingly, it is possible to suppress the production costs of the turbine stator vane.

(2) According to at least one embodiment of the present invention, a turbine stator vane includes: an airfoil portion; a shroud disposed on at least one of the side of a tip end portion or the side of a root end portion of the airfoil portion; and a protruding portion protruding toward an outer side opposite to the airfoil portion across a gas path surface in a radial direction. The shroud includes: a circumferential-direction passage disposed at the side of a trailing edge and extending in a circumferential direction; and a plurality of trailing edge end portion passages arranged in the circumferential direction at the side of the trailing edge, each trailing edge end portion passage having a first end portion connected to the circumferential-direction passage and a second end portion having an opening on a trailing edge end surface of the shroud. The circumferential-direction passage includes a center passage, and a plurality of circumferential-direction end portion passages connecting to opposite ends, in the circumferential direction, of the center passage, each circumferential-direction end portion passage extending to an end portion, in the circumferential direction, of the shroud. An axial-direction passage width of the center passage at a position where the trailing edge end portion passages connect to the circumferential-direction passage is formed to be smaller than an axial-direction passage width of the circumferential-direction end portion passages. A position, in an axial direction, of the center passage to which the trailing edge end portion passages connect is positioned at the side of the leading edge with respect to a position of the trailing-edge side end surface of the protruding portion at a position where the protruding portion connects to the shroud.

As described above, in a case where the shroud is cooled through contact with cooling air on the surface of the shroud opposite to the gas path surface, the region of the shroud proximate to the gas path surface at the connection position of the protruding portion has the protruding portion on the surface opposite to the gas path surface, and thus the cooling effect of the cooling air may decrease, and the region may have a higher temperature than the rest of the region.

With the above configuration (2), as described below, it is possible to cool, even more efficiently, the region of the shroud close to the gas path surface at the connection position of the protruding portion with the cooling air flowing through the plurality of trailing edge end portion passages arranged in the circumferential direction at the side of the trailing edge.

That is, with the above configuration (2), the axial-direction passage width of the center passage at the position where the trailing edge end portion passages connect to the circumferential-direction passage is formed to be smaller than the axial-direction passage width of the circumferential-direction end portion passages. That is, the axial-direction passage width of the circumferential-direction end portion passages is greater than the axial-direction passage width of the center passage at the above position.

For instance, in the configuration to be considered below, the cooling air is supplied to the center passage by supplying the cooling air to the circumferential-direction end portion passages from the side of the end surfaces of the shroud in the circumferential direction. To supply the cooling air, via the circumferential-direction passage, to the plurality of trailing edge end portion passages arranged in the circumferential direction while suppressing variation of supply amount among the respective trailing edge end portion passages, it is desirable to sufficiently increase the flow-passage cross-sectional area of the upstream region with respect to the flow direction of the cooling air in the circumferential-direction passage and suppress pressure loss. With the above configuration (2), the circumferential-direction end portion passages positioned at the upstream side of the center passage with respect to the flow of the cooling air have a greater axial-direction passage width. Thus, it is possible to supply the cooling air, via the circumferential-direction passage, to the plurality of trailing edge end portion passages arranged in the circumferential direction while suppressing variation of supply amount among the respective trailing edge end portion passages. Thus, it is possible to cool, even more efficiently, the region of the shroud close to the gas path surface at the connection position of the protruding portion with the cooling air flowing through the plurality of the trailing edge end portion passages arranged in the circumferential direction at the side of the trailing edge.

Furthermore, with the above configuration (2), the position, in the axial direction, of the center passage where the trailing edge end portion passages connect is positioned at the side of the leading edge with respect to the position of the trailing-edge side end surface of the protruding portion at the position where the protruding portion connects to the shroud. Thus, it is possible to efficiently cool the region of the shroud close to the gas path surface at the connection position of the protruding portion with the cooling air flowing through the plurality of trailing edge end portion passages arranged in the circumferential direction at the side of the trailing edge. Accordingly, it is possible to suppress temperature increase of the region compared to the rest of the region, and improve the effect to cool the shroud of the turbine stator vane.

(3) In some embodiments, in the above configuration (1), the first end portion of each trailing edge end portion passage is connected to the circumferential-direction passage at an upstream end in the axial direction.

With the above configuration (3), when the first end portion of the trailing edge end portion passage is connected to the upstream end, in the axial direction, of the trailing edge end portion passage, it is possible to position the trailing edge end portion passage closer to the gas path surface, and position the starting position (upstream end position) of the trailing edge end portion passage closer to the side of the leading edge. Accordingly, it is possible to efficiently cool the region of the shroud close to the gas path surface at the connection position of the protruding portion with the cooling air flowing through the plurality of trailing edge end portion passages arranged in the circumferential direction at the side of the trailing edge.

(4) In some embodiments, in the above configuration (2), the center passage includes, in a cross-sectional view as seen in the circumferential direction, an oblique passage having a third end portion to protrude closer to the gas path surface toward the side of the leading edge, and a fourth end portion formed at the side of the trailing edge with respect to the third end portion, the oblique passage having an opening portion disposed on the trailing-edge side end surface of the protruding portion and closed by a lid portion.

With the above configuration (4), the center passage included in the circumferential-direction passage has the opening portion on the trailing-edge side end surface of the protruding portion. Furthermore, the center passage has, in a cross-sectional view in the circumferential direction, the third end portion protruding closer to the gas path surface toward the leading edge, and the fourth end portion formed at the side of the trailing edge with respect to the third end portion. Thus, for instance, in a case where the turbine stator vane having the above configuration (4) is produced by casting, it is possible to form the opening portion on the trailing-edge side end surface of the protruding portion and at least a part of the center passage connecting to the opening portion easily at the same time as casting the turbine stator vane. Accordingly, it is possible to suppress the production costs of the turbine stator vane.

(5) In some embodiments, in the above configuration (1) or (3), the circumferential-direction passage includes a center passage having the opening portion and circumferential-direction end portion passages connecting to opposite ends, in the circumferential direction, of the center passage, each circumferential-direction end portion passage extending to an end portion, in the circumferential direction, of the shroud. An axial-direction passage width of the center passage at a position where the trailing edge end portion passages connect to the circumferential-direction passage is formed to be smaller than an axial-direction passage width of the circumferential-direction end portion passages.

With the above configuration (5), as described above with reference to the configuration (2), it is possible to cool, even more efficiently, the region of the shroud close to the gas path surface at the connection position of the protruding portion with the cooling air flowing through the plurality of trailing edge end portion passages arranged in the circumferential direction at the side of the trailing edge.

(6) In some embodiments, in any one of the above configuration (2), (4), or (5), a position, in a vane height direction, of the first end portion where each trailing edge end portion passage connects to the circumferential-direction passage is more proximate to the gas path surface than a position, in the vane height direction, of the circumferential-direction end portion passages.

With the above configuration (6), it is possible to position the trailing edge end portion passage closer to the gas path surface, and thus it is possible to efficiently cool the region of the shroud close to the gas path surface at the connection position of the protruding portion with the cooling air flowing through the plurality of the trailing edge end portion passages arranged in the circumferential direction at the side of the trailing edge.

(7) In some embodiments, in any one of the above configurations (2), or (4) to (6), the center passage includes: a first center passage formed at the side of the gas path surface; and a second center passage formed at an outer side, in a vane height direction, of the first center passage from the gas path surface, the second center passage being in communication with the first center passage and having an opening portion formed on the trailing-edge side end surface of the protruding portion.

(8) In some embodiments, in the above configuration (7), an axial-direction passage width of the first center passage is formed to be smaller than an axial-direction passage width of the second center passage, and a position, in the axial direction, of an end portion of the first center passage at the side of the gas path surface is positioned at the side of the leading edge with respect to a position, in the axial direction, of the second center passage at a connection position of the second center passage to the first center passage.

With the above configuration (8), the axial-direction passage width of the first center passage is formed to be smaller than the axial-direction passage width of the second center passage, and a position, in the axial direction, of an end portion of the first center passage at the side of the gas path surface is positioned closer to the side of the leading edge than a position, in the axial direction, of the second center passage at a connection position of the second center passage to the first center passage. Thus, the end portion opposite to, with respect to the axial direction, the end portion at the side of the leading edge, in the axial direction, of the first center passage is positioned at the side of the leading edge with respect to the end portion opposite to, with respect to the axial direction, the end portion at the side of the leading edge, in the axial direction, of the second center passage. Thus, by connecting the one end portion of the trailing edge end portion passage to the first center passage, it is possible to position the starting position (upstream end position) of the trailing edge end portion passage closer to the leading edge. Accordingly, it is possible to efficiently cool the region of the shroud close to the gas path surface at the connection position of the protruding portion with the cooling air flowing through the plurality of the trailing edge end portion passages arranged in the circumferential direction at the side of the trailing edge.

(9) In some embodiments, in the above configuration (8), the plurality of trailing edge end portion passages arranged in the circumferential direction includes: a first trailing edge end portion passage having the first end portion connected to the first center passage and the second end portion having an opening on the trailing edge end surface of the shroud; and a second trailing edge end portion passage having the first end portion connected to at least one of the circumferential-direction end portion passages and the second end portion having an opening on the trailing edge end surface of the shroud.

With the above configuration (9), as the above configuration (8) is included, as described above, the end portion opposite to, with respect to the axial direction, the end portion at the side of the leading edge, in the axial direction, of the first center passage is positioned at the side of the leading edge with respect to the end portion opposite to, with respect to the axial direction, of the end portion at the side of the leading edge, in the axial direction, of the second center passage. Furthermore, with the above configuration (9), the first end portion of the first trailing edge end portion passage is connected to the first center passage, and thus it is possible to position the starting position (upstream end position) of the first trailing edge end portion passage closer to the side of the leading edge. Accordingly, it is possible to efficiently cool the region of the shroud close to the gas path surface at the connection position of the protruding portion with the cooling air flowing through the plurality of the trailing edge end portion passages arranged in the circumferential direction at the side of the trailing edge.

Furthermore, with the above configuration (9), the first end portion of the second trailing edge end portion passage is connected to at least one of the circumferential-direction end portion passages, and thus it is possible to cool the region at the opposite end sides, in the circumferential direction, of the shroud efficiently with the cooling air flowing through the second trailing edge end portion passage.

(10) In some embodiments, in any one of the above configurations (7) to (9), the opening portion of the second center passage may extend from the trailing-edge side end surface of the protruding portion to an end surface of the shroud at an opposite side to the airfoil portion across the gas path surface.

(11) In some embodiments, in any one of the above configurations (1) to (10), the shroud includes: a space portion formed by a bottom surface and an outer wall portion extending in a vane height direction from the bottom surface; and a lateral portion passage formed on a lateral end portion in the circumferential direction from the side of the leading edge toward the side of the trailing edge, the lateral portion passage having a leading edge end surface being in communication with the space portion and a trailing edge end surface being in communication with the circumferential-direction passage.

With the above configuration (11), by supplying the cooling air to the lateral portion passage from the space portion, it is possible to cool the region in the vicinity of the lateral end portion, in the circumferential direction, of the shroud, from the side of the leading edge toward the side of the trailing edge.

(12) In some embodiments, in any one of the above configurations (1) to (11), the shroud includes an inner shroud formed at the side of the tip end portion of the airfoil portion and an outer shroud formed at the side of the root end portion of the airfoil portion.

With the above configuration (12), the inner shroud and the outer shroud each have the above configuration (1) or (2), and thus it is possible to improve the cooling effect for each of the inner shroud and the outer shroud.

(13) According to an embodiment of the present invention, a gas turbine includes the turbine stator vane according to any one of the above configurations (1) to (12). Thus, it is possible to improve the effect to cool the shroud of the turbine stator vane. Accordingly, it is possible to contribute to improvement of the durability of the gas turbine.

(14) According to an embodiment of the present invention, in the method of producing a turbine stator vane, the turbine stator vane includes: an airfoil portion; a shroud disposed on at least one of the side of a tip end portion or the side of a root end portion of the air foil portion; and a protruding portion protruding toward an opposite side to the airfoil portion across a gas path surface. The method at least includes: a step of forming, by casting, a second center passage extending in a circumferential direction and having an opening disposed on a trailing-edge side end surface of the protruding portion and closed by a lid portion; a step of forming, by electro-discharge machining or machine processing, a first center passage extending in the circumferential direction, the first center passage having, in a cross-sectional view as seen in the circumferential direction, a third end portion protruding closer to the gas path surface toward the leading edge and a fourth end portion being in communication with the second center passage; and a step of forming, by the electro-discharge machining or the machine processing, a plurality of trailing edge end portion passages arranged in the circumferential direction at the side of the trailing edge, each trailing edge end portion passage having a first end portion connected to the first center passage and a second end portion having an opening on a trailing edge end surface of the shroud.

According to the above method (14), of the circumferential-direction passage that is difficult to form only by casting, at least the first center passage and the trailing edge end portion passage is formed by electro-discharge machining or machine processing, and the second center passage is formed by casting. Thus, the processing is easier and the processing time is shortened, which makes it possible to suppress the production costs of the turbine stator vane.

(15) In some embodiments, in the above configuration (14), the method further includes a step of forming, by electro-discharge machining or machine processing, a circumferential-direction end portion passage connected to the first center passage and disposed between a lateral end portion of the shroud and the first center passage, the circumferential-direction end portion passage extending in the circumferential direction.

With the above configuration (15), the circumferential-direction end portion passage is formed by electro-discharge machining or machine processing, and thus it is possible to facilitate processing of the circumferential-direction end portion passage.

Advantageous Effects

According to at least one embodiment of the present invention, it is possible to improve the effect to cool a shroud of a turbine stator vane.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
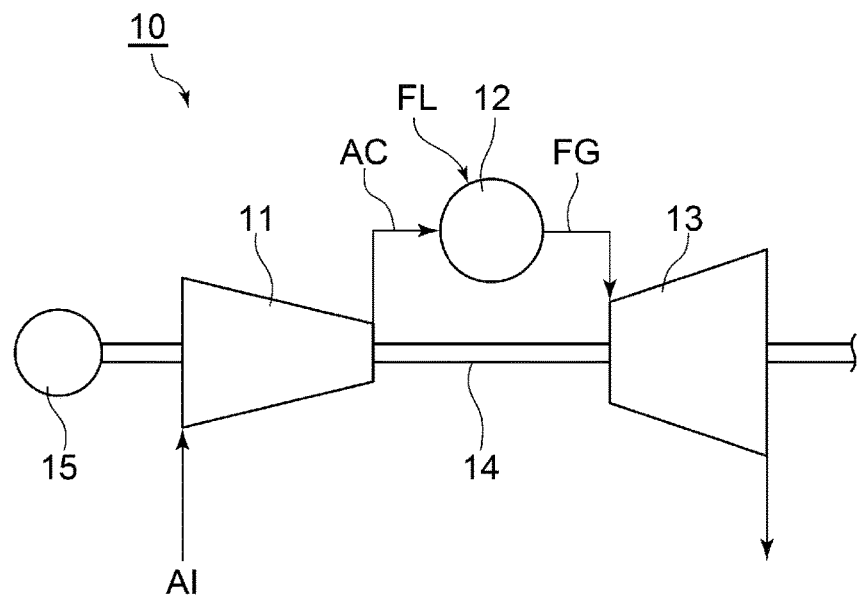
FIG. 1 is a schematic diagram of an overall configuration of a gas turbine.
Figure 2:
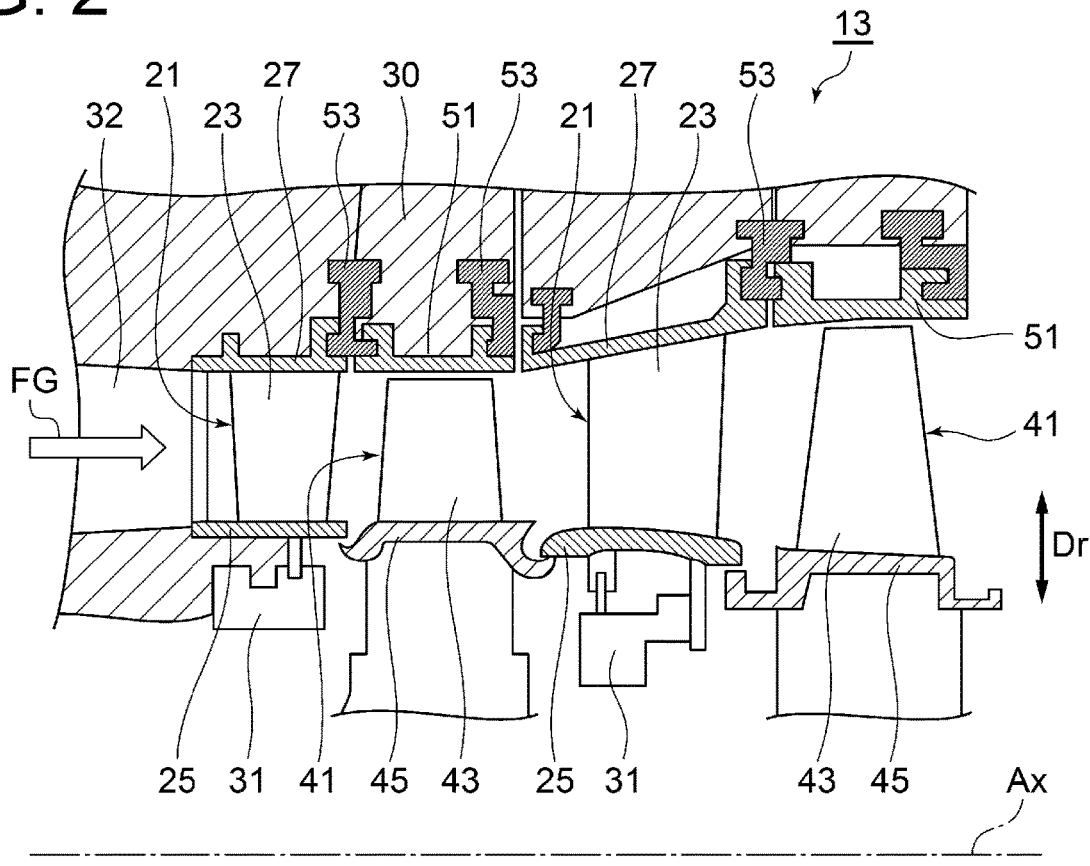
FIG. 2 is a cross-sectional view showing a gas flow passage of a turbine.

FIG. 1 is a schematic diagram of an overall configuration of a gas turbine. FIG. 2 is a cross-sectional view showing a gas flow passage of a turbine.

In the present embodiment, as depicted in FIG. 1, a gas turbine 10 includes a compressor 11, a combustor 12, and a turbine 13 arranged coaxially via a rotor 14. A generator 15 is coupled to an end portion of the rotor 14. In the following description, the extension direction of the axis of the rotor 14 is referred to as the axial direction Da, the circumferential direction about the axis of the rotor 14 is referred to as the circumferential direction Dc, and the direction perpendicular to the axis Ax of the rotor 14 is referred to as the radial direction Dr. Furthermore, the radial direction Dr is referred to as the vane height direction.

The compressor 11 generates compressed air AC having a high temperature and a high pressure, as air AI sucked in from an air inlet flows through a plurality of stator vanes and a plurality of rotor blades to be compressed. The combustor 12 supplies a predetermined fuel FL to the compressed air AC, and combusts the compressed air, whereby combustion gas FG having a high temperature and a high pressure is generated. The turbine 13 rotary drives the rotor 14 as the high-temperature and high-pressure combustion gas FG generated by the combustor 12 passes through the plurality of stator vanes and the rotor blades, and drives the generator 15 coupled to the rotor 14.

Figure 4:
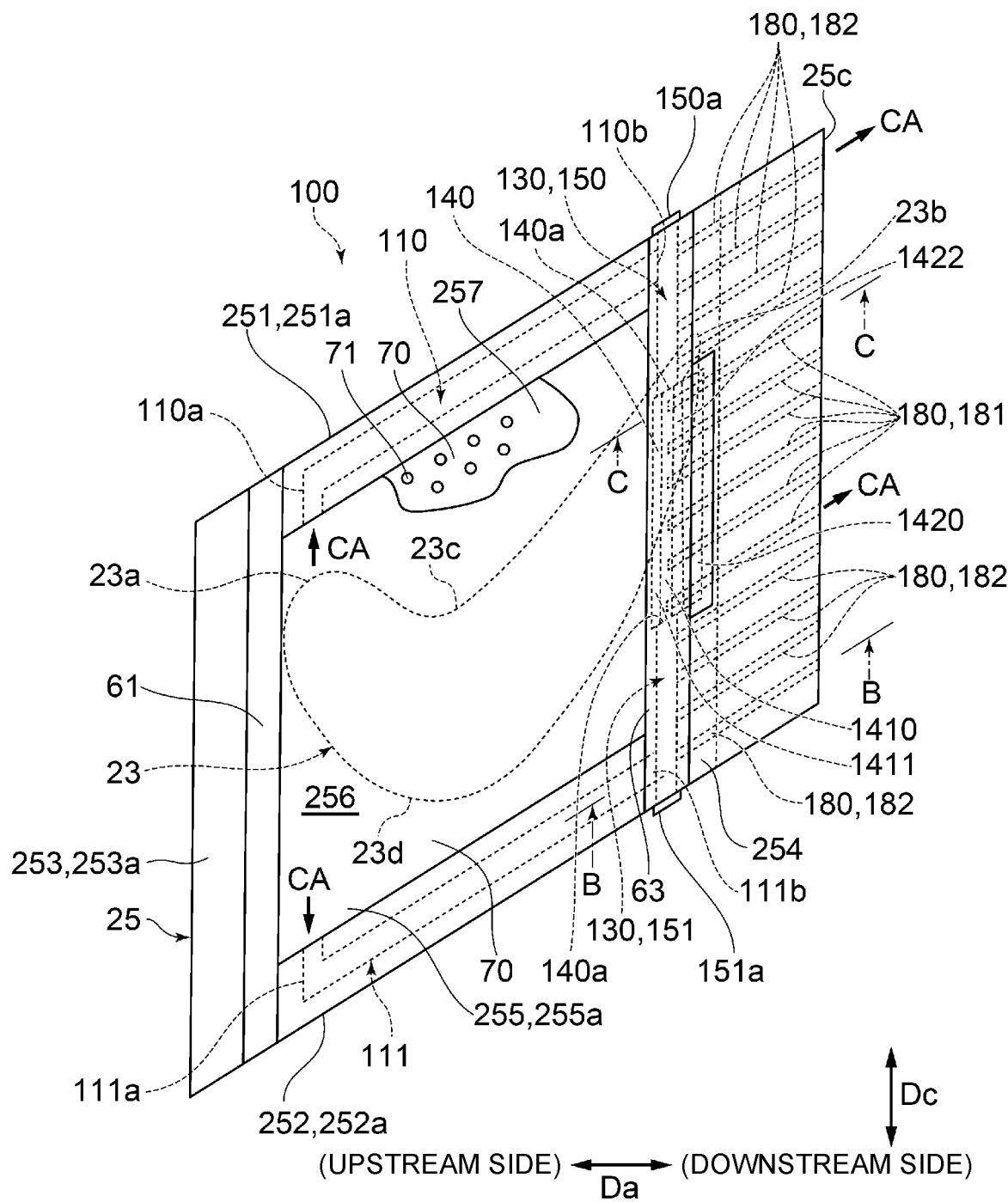
FIG. 4 is a planar view of an inner shroud of a stator vane taken along the arrows A-A in FIG. 3 as seen in the direction of the arrows.

Furthermore, as depicted in FIG. 2, in the turbine 13, the turbine stator vanes (stator vanes) 21 are fixed to the inner shroud 25 at the side of the root end portions 23*f* of the airfoil portions 23, and fixed to the outer shroud 27 at side of the tip end portions 23*e*. The turbine rotor blades (rotor blades) 41 are fixed to a platform 45 at the side of the root end portions 23*f* of the airfoil portions 23. Furthermore, the outer shroud 27 and the ring segment 51 disposed at the side of the tip end portions 32*e* of the rotor blades 41 are supported by the casing (turbine casing) 30 via a heat insulation ring 53, and the inner shroud 25 is supported by a support ring 31. Thus, the combustion gas flow passage 32 through which the combustion gas FG passes is formed along the axial direction Da as a space surrounded by the inner shroud 25, the outer shroud 27, the platform 45, and the ring segment 51. Furthermore, as depicted in FIG. 4, the airfoil portion 23 is formed to have a pressure-side vane surface 23*c* formed of a concave surface being a pressure surface, and a suction-side vane surface 23*d* formed of a convex surface being a suction surface. The pressure-side vane surface 23*c* and the suction-side vane surface 23*d* are connected at the leading edge 23*a* at the upstream side in the axial direction and the trailing edge 23*b* at the downstream side in the axial direction, whereby an integrated airfoil portion 23 is formed.

Furthermore, the inner shroud 25 and the outer shroud 27 function as gas path surface forming members. A gas path surface forming member is a member that defines the combustion gas flow passage 32 and has a gas path surface that makes contact with the combustion gas FG. When it is not particularly necessary to differentiate the inner shroud 25 and the outer shroud 27, the inner shroud and the outer shroud 27 may be merely referred to as shrouds 2.

Figure 3:
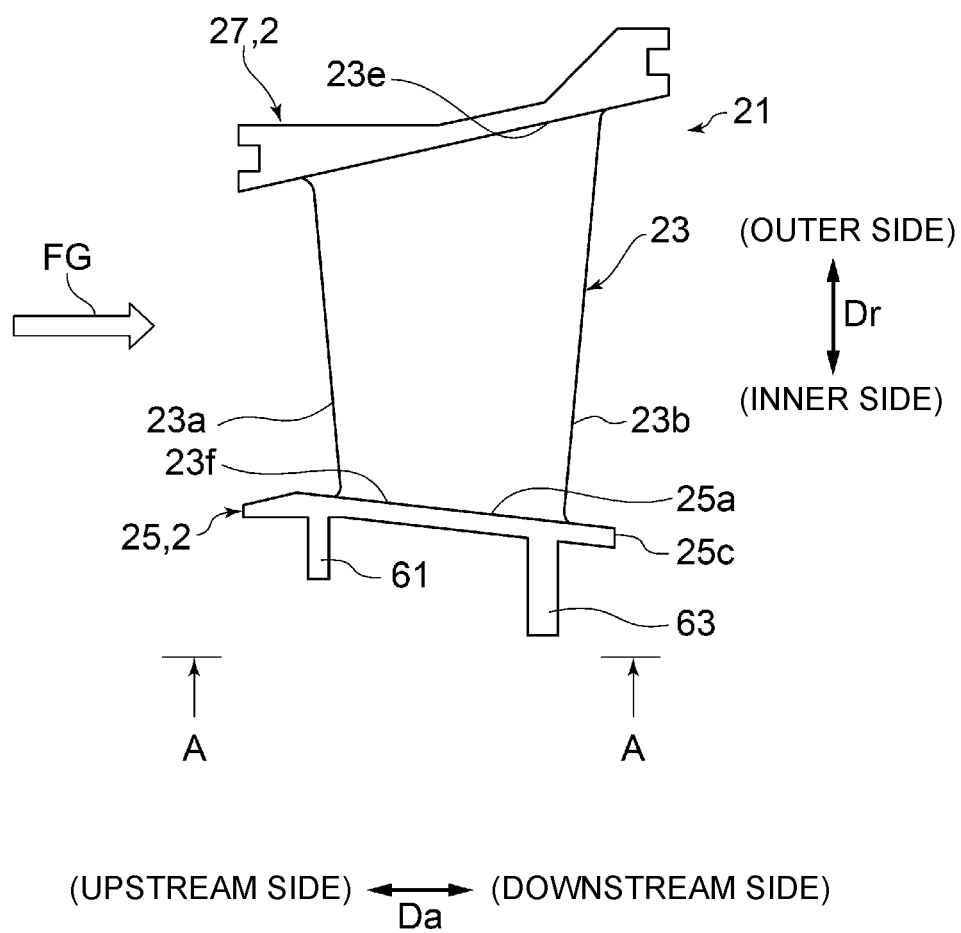
FIG. 3 is a front view showing a stator vane according to some embodiments.
Figure 5:
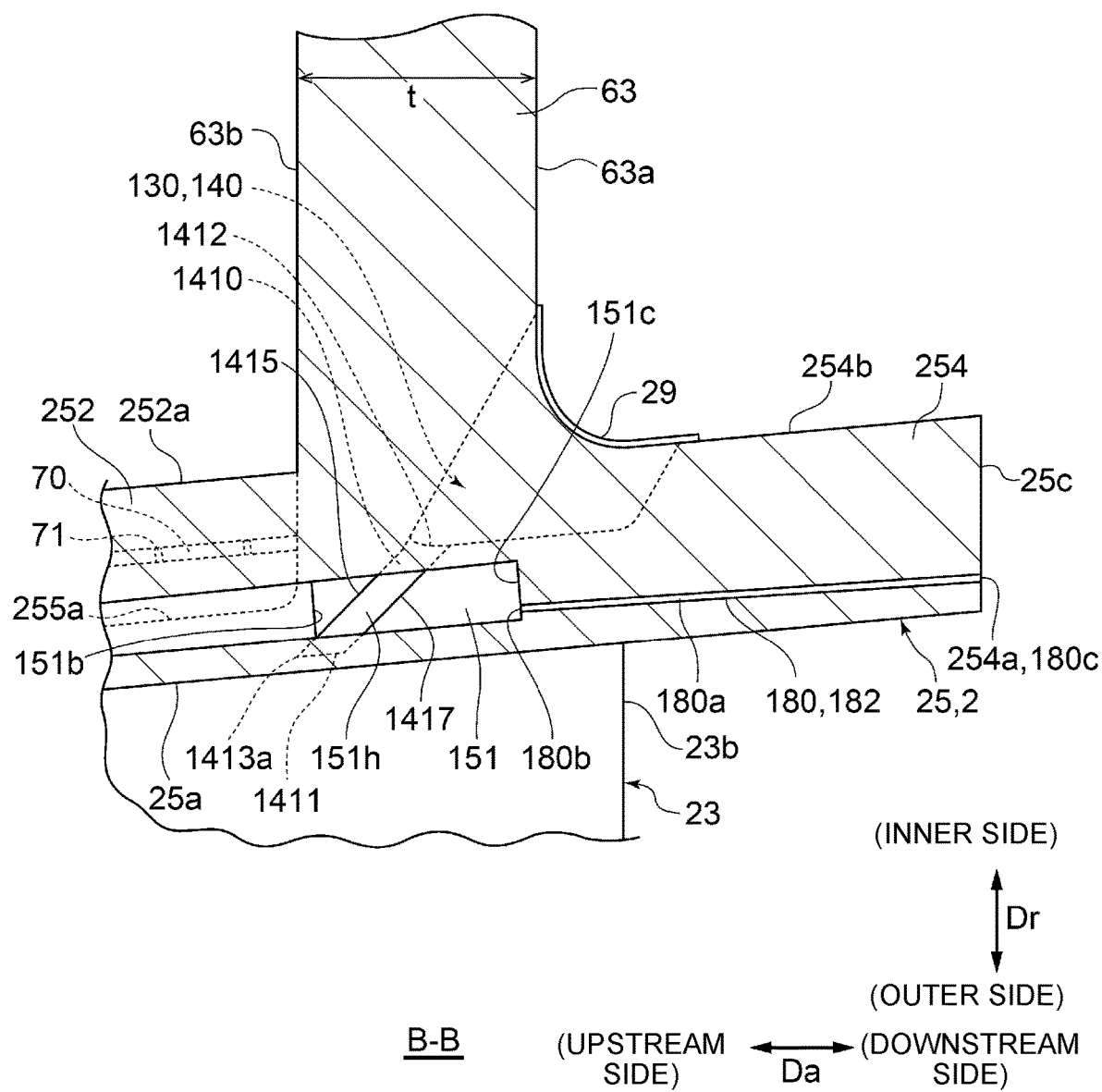
FIG. 5 is a cross-sectional view in a direction of arrows B-B in FIG. 4.
Figure 6:
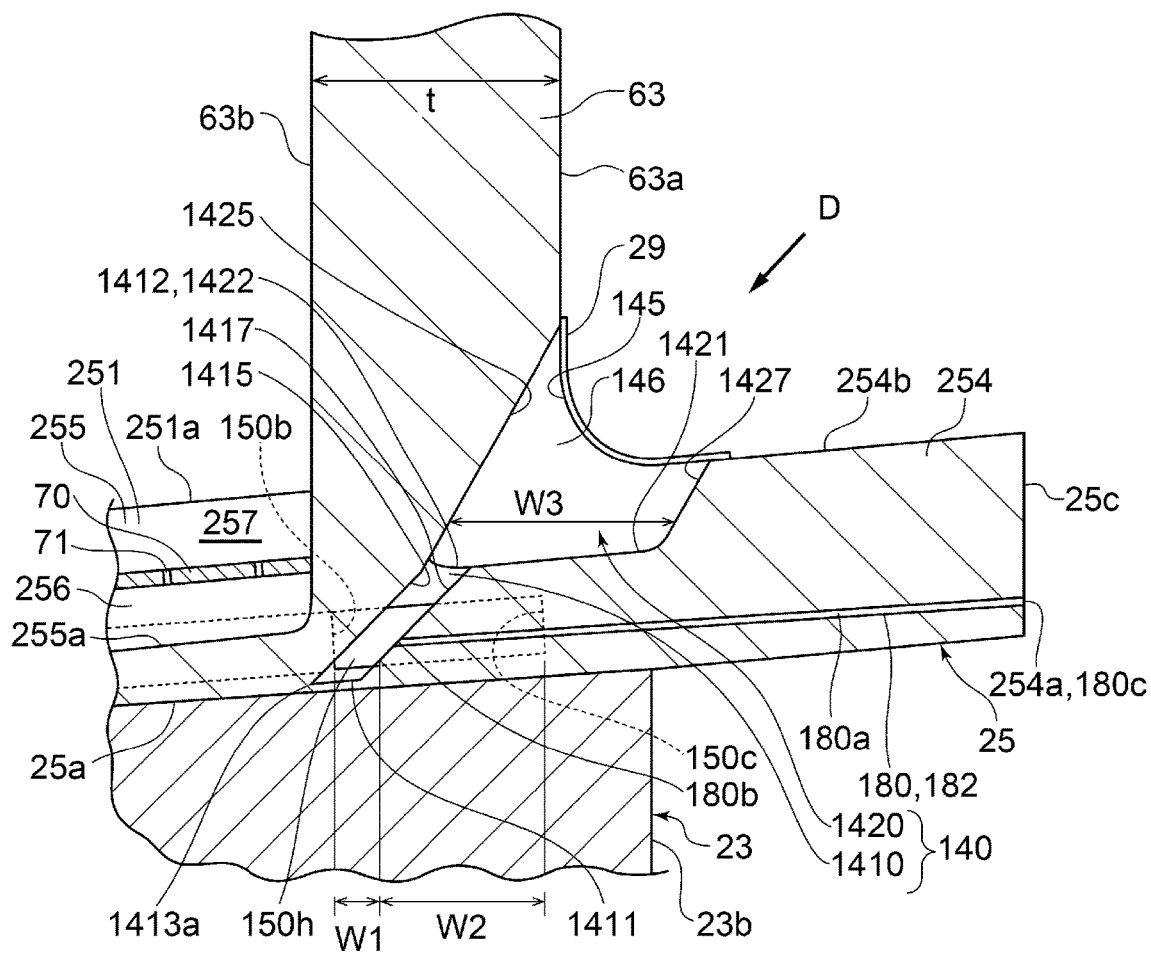
FIG. 6 is a cross-sectional view in a direction of arrows C-C in FIG. 4.

Hereinafter, the stator vane 21 according to some embodiments will be described. FIG. 3 is a front view showing a stator vane according to some embodiments. FIG. 4 is a view in a direction of arrows A-A from FIG. 3, showing a planar view of a state where the lid portion 29 is not provided. FIG. 5 is a view in a direction of arrows B-B from FIG. 4. FIG. 6 is a view in a direction of arrows C-C from FIG. 4.

As depicted in FIG. 3, a stator vane 21 according to some embodiments has an inner shroud 25 at the side of the root end portion 23*f* of the airfoil portion 23, that is, an end portion in the vane height direction (inner end portion in the radial direction Dr), and an outer shroud 27 at the side of the tip end portion 23*e*, that is, the other end portion in the vane height direction (outer end portion in the radial direction Dr).

As depicted in FIG. 3, the stator vane 21 according to some embodiments, for instance at the inner shroud 25, has a leading-edge side retainer 61 and a trailing-edge side retainer 63 (protruding portions) which extend inward in the radial direction Dr opposite to the airfoil portion 23 across the gas path surface 25*a*. The leading-edge side retainer 61 is formed at the side of the leading edge 23*a* of the airfoil portion 23, and the trailing-edge side retainer 63 is formed at the side of the trailing edge 23*b* of the airfoil portion 23. The leading-edge side retainer 61 and the trailing-edge side retainer 63 are mounted to the casing 30 via the support ring 31 (see FIG. 2.)

Hereinafter, the passage of cooling air in the inner shroud 25 of the stator vane 21 according to some embodiments will be described.

As depicted in FIG. 4, in the gas turbine 10 according to an embodiment, the inner shroud 25 of the stator vane 21 according to some embodiments includes, at the inner side in the radial direction Dr opposite to the gas path surface 25*a*, an inner region (space portion) 255 which is capable of storing cooling air supplied from outside. The inner region 255 (space portion) is a region surrounded by the peripheral edge portions of the inner shroud 25, that is: a lateral end portion 251 at the side of the pressure-side vane surface 23*c* and a lateral end portion 252 at the side of the suction-side vane surface 23*d* forming opposite end portions of the inner shroud 25 in the circumferential direction; a leading edge end portion 253 at the side of the leading edge 23*a* in the axial direction Da; and a trailing edge end portion 254 at the side of the trailing edge 23*b*. The inner region 255 forms a space portion 257 and an impingement space 256 recessed inward in the radial direction Dr. The inner region bottom surface 255*a* forming the bottom surface of the inner region 255 forms an inner surface opposite to the gas path surface 25*a* in the radial direction. That is, the space portion 257 and the impingement space 256 are a space formed by the inner region bottom surface 255*a*, the lateral end portions 251, 252, the leading edge end portion 253, and the trailing edge end portion 254 being outer wall portions that extend in the vane height direction (radial direction) from the inner region bottom surface 255*a*.

The gas turbine 10 according to an embodiment is configured such that cooling air CA is supplied to the space portion 257 from outside.

As depicted in FIG. 6, in the inner region 255, an impingement plate 70 having a plurality of through holes 71 are disposed so as to cover the inner region bottom surface 255*a* entirely. In FIG. 4, only a part of the impingement plate 70 having the through holes 71 is depicted. The inner region 255 forming the space portion is divided by the impingement plate 70, into the space portion 257 at the inner side in the radial direction Dr and the impingement space 256 at the outer side in the radial direction Dr. The space portion 257 and the impingement space 256 are in communication via the through holes 71 of the impingement plate 70.

The cooling air CA supplied to the space portion 257 is supplied to the impingement space 256 via the through holes 71, and cools the inner region bottom surface 255*a* through impingement (impingement cooling). By performing impingement cooling on the inner region bottom surface 255*a*, excessive heating of the gas path surface 25*a* by combustion gas is suppressed. The cooling air CA discharged to the impingement space 256 surrounded by the impingement plate 70 and the inner region bottom surface 255*a* performs impingement cooling on the inner region bottom surface 255*a*, and then performs film cooling on the gas path surface 25*a* as the cooling air CA is being supplied to the lateral portion passages 110, 111 (air passages 100) described below or discharged to combustion gas from the film cooling holes (not depicted) formed on the inner region bottom surface 255*a*. Furthermore, depending on the vane shape, the cooling air CA before or after performing impingement cooling on the inner region bottom surface 255*a* may be supplied to the cooling air passage (not depicted) formed on the airfoil portion 23 to cool the airfoil portion 23.

The stator vane 21 according to some embodiments includes an air passage 100 for letting the cooling air CA supplied to the space portion 257 flow through the trailing edge end portion 254 of the inner shroud 25. The air passage 100 includes lateral portion passages 110, 111, a circumferential-direction passage 130, and trailing edge end portion passages 180.

The lateral portion passages 110, 111 are air passages formed at the lateral end portions 251, 252 of the inner shroud 25, from the side of the leading edge 23a toward the side of the trailing edge 23b. The openings formed on the lateral portion passages 110, 111 at the side of the leading edge end surfaces 110a, 111a are in communication with the impingement space 256, and the side at the trailing edge end surfaces 110b, 111b of the lateral portion passages 110, 111 are in communication with the circumferential-direction passages 130. The lateral portion passage 111 is an air passage disposed proximate to the side of the suction-side vane surface 23d, and the lateral portion passage 110 is an air passage disposed proximate to the pressure-side vane surface 23c.

The circumferential-direction passage 130 is an air passage which is disposed at the trailing edge end portion 254 and which extends in the circumferential direction. The opposite end portions, in the circumferential direction Dc, of the circumferential-direction passage 130 are closed by passage lids 150a, 151a described below, and connected to the trailing edge end surfaces 110b, 111b of the lateral portion passages 110, 111 at the upstream side in the axial direction Da. The circumferential-direction passage 130 will be described later.

The trailing edge end portion passage 180 is an air passage formed of a plurality of cooling holes 180a arranged on the trailing edge end portion 254 in the circumferential direction, each having an upstream end (first end portion) 180b connected to the circumferential-direction passage 130, and the other end portion (second end portion) 180c being a downstream end in the axial direction Da with an opening on the trailing edge end surface 25c of the inner shroud 25.

In the air passage 100 having the above configuration according to some embodiments, the cooling air CA in the space portion 257 is supplied to the lateral portion passages 110, 111 via the impingement space 256, and flows into the inside of the air passage 100 from the leading edge end surfaces 110a, 111a of the lateral portion passages 110, 111. The cooling air CA flows through the lateral portion passages 110, 111 from the side of the leading edge 23a toward the side of the trailing edge 23b, and performs convective cooling mainly on the lateral end portions 251, 252. The cooling air CA after flowing through the lateral portion passages 110, 111 toward the side of the trailing edge 23b flows into the circumferential-direction passage 130 from the lateral portion passages 110, 111, and then flows into each of the plurality of trailing edge end portion passages 180 via the circumferential direction 130. The cooling air CA after flowing into each of the plurality of trailing edge end portion passages 180 flows from the upstream ends 180b of the trailing edge end portion passages 180 toward the trailing edge end surface 25c of the inner shroud 25, and then performs convective cooling mainly on the trailing edge end portion 254. The cooling air CA is discharged to combustion gas from the trailing edge end surface 25c.

In the stator vane 21 according to some embodiments, the circumferential-direction passage 130 includes a center passage (oblique passage) 140. The center passage 140 has, as depicted in FIG. 6 for instance, in a cross-sectional view as seen in the circumferential direction, a third end portion (first top surface 1411) being an outer end portion in the radial direction protruding closer to the gas path surface 25a toward the side of the leading edge 23a being the upstream side in the axial direction Da. The radially inner end portion 1412 of the center passage 140, that is, the fourth end portion 1412 having a connection opening 1422 described below formed thereon, is formed at the side of the trailing edge 23b with respect to the end portion at the outer side in the radial direction (first top surface 1411). The center passage 140 has an opening portion 145 formed on the trailing-edge side end surface 63a of the trailing-edge side retainer 63 being a protruding portion and the trailing-edge side lower end portion 254b of the trailing edge end portion 54. The opening portion 145 is closed by a lid portion 29 (see FIG. 7 described below).

In the stator vane 21 according to some embodiments, the position, in the axial direction Da, of the upstream end 180b where the trailing edge end portion passage 180 connects to the circumferential-direction passage 130 is positioned at the side of the leading edge 23a with respect to the position of the trailing-edge side end surface 63a of the trailing-edge side retainer 63 at the position where the trailing-edge side retainer 63 being a protruding portion connects to the inner shroud 25. The position where the trailing-edge side end surface 63a of the trailing-edge side retainer 63 connects to the inner shroud 25 is the position where the inner shroud 25 intersects with the extension line of the trailing-edge side end surface 63a extending outward in the radial direction Dr.

As described above, in a case where the inner shroud 25 is cooled by impingement cooling by blowing cooling air to the inner region bottom surface 255a being an inner surface of the shroud 25, in the radial direction, from the gas path surface 25a, the vicinity area of connection of the trailing-edge side retainer 63 cannot be sufficiently cooled by the impingement cooling by the cooling air alone.

In the stator vane 21 according to some embodiments, the position, in the axial direction, of the upstream end 180b where the trailing edge end portion passage 180 connects to the circumferential-direction passage 130 is positioned at the side of the leading edge 23a with respect to the position of the trailing-edge side end surface 63a of the trailing-edge side retainer 63 at the position where the trailing-edge side retainer 63 connects to the inner shroud 25. Thus, it is possible to efficiently cool the region of the inner shroud 25 close to the gas path surface 25a at the connection position of the retainer 63 with the cooling air that flows through the plurality of trailing edge end portion passages 180 arranged in the circumferential direction at the trailing edge end portion 254. Thus, it is possible to suppress temperature increase of the region compared to the rest of the region, and improve the effect to cool the inner shroud 25 of the stator vane 21.

Furthermore, in the stator vane 21 according to some embodiments, the center passage 140 included in the circumferential-direction passage 130 has an opening portion 145 formed from the trailing-edge side end surface 63a of the retainer 63 to the trailing-edge side lower end surface 254b of the trailing edge end portion 254. Furthermore, the center passage 140 has, in a cross-sectional view in the circumferential direction, an end portion (first top surface 1411) disposed at the outer side in the radial direction protruding closer to the gas path surface 25a toward the side of the leading edge 23a, and an end portion at the inner side in the radial direction formed at the side of the trailing edge 23b with respect to the end portion at the outer side in the radial direction (the top surface 1411). Thus, for instance, in a case where the stator vane 21 according to some embodiments is to be produced by casting, it is possible to easily form, at the time of casting of the stator vane 21, the opening portion 145 extending from the trailing-edge side end surface 63a of the trailing-edge side retainer 63 to the trailing-edge side lower end surface 254b of the trailing edge end portion 254, and at least a part of the center passage 140 connecting to the opening portion 145. Accordingly, it is possible to suppress the production cost of the stator vane 21.

In the stator vane 21 according to some embodiments, the circumferential-direction passage 130 includes: a center passage 140; and two circumferential-direction end portion passages 150, 151 connecting to the opposite ends, in the circumferential direction, of the center passage 140 and extending to end surfaces 251a, 252a of the lateral end portions 251, 252, in the circumferential direction, of the inner shroud 25. That is, in the stator vane 21 according to some embodiments, the center passage 140 is in communication with the lateral portion passages 110, 111 via the circumferential-direction end portion passages 150, 151.

Furthermore, in the stator vane 21 according to some embodiments, the axial-direction passage width W1 of the center passage 140 at the position where the trailing edge end portion passages 180 connect to the circumferential-direction passage 130 is formed to be smaller than the axial-direction passage width W2 of the circumferential-direction end portion passages 150, 151 (see FIG. 6).

That is, the axial-direction passage width W2 of the circumferential-direction end portion passages 150, 151 are greater than the axial-direction passage width W1 of the center passage 140 at the position where the trailing edge end portion passage 180 connects to the circumferential-direction passage 130.

For instance, in the configuration to be considered below, as in the stator vane 21 according to some embodiments, the cooling air CA is supplied to the center passage 140 by supplying the cooling air CA to the circumferential-direction end portion passages 150, 151 from the side of the end surfaces 251a, 252a of the lateral end portions 251, 252, in the circumferential direction, of the inner shroud 25. To supply the cooling air CA, via the circumferential-direction passage 130, to the plurality of trailing edge end portion passages 180 arranged in the circumferential direction while suppressing variation of supply amount among the respective trailing edge end portion passages 180, it is desirable to sufficiently increase the flow-passage cross-sectional area of the upstream region of the cooling air CA in the circumferential-direction passage 130 and suppress pressure loss. In the stator vane 21 according to some embodiments, the circumferential-direction end portion passages 150, 151 positioned at the upstream side of the center passage 140 have a greater axial-direction passage width, and pressure loss is reduced at the inlet side where the cooling air CA flows in the circumferential-direction passage 130. Furthermore, the flow-passage cross-sectional areas of the circumferential-direction end portion passages 150, 151 are formed to be greater than the flow-passage cross-sectional areas of the lateral portion passages 110, 111.

By suppressing the pressure loss in the circumferential-direction passage 130, the pressure gradient in the circumferential direction of the circumferential-direction passage 130 is eliminated, and the inlet pressure of the cooling air CA at the upstream end 180b of the trailing edge end portion passage 180 is equalized, whereby the variation in the supply amount of the trailing edge end portion passage 180 is suppressed. Thus, it is possible to supply the cooling air CA, via the circumferential-direction passage 130, to the plurality of trailing edge end portion passages 180 arranged in the circumferential direction while suppressing variation of supply amount among the respective trailing edge end portion passages 180. Thus, it is possible to cool, even more efficiently, the region of the inner shroud 25 close to the gas path surface 25a at the connection position of the trailing-edge side retainer 63 with the cooling air flowing through the plurality of the trailing edge end portion passages 180 arranged in the circumferential direction at the trailing edge end portion 254.

In the stator vane 21 according to some embodiments, the upstream end 180b of the trailing edge end portion passage 180 is connected to the end portion of the circumferential-direction passage 130 at the outer side in the radial direction (in the vicinity of the top surface 1411).

As described above, the circumferential-direction passage 130 has, in a cross-sectional view in the circumferential direction, an end portion at the outer side in the radial direction (in the vicinity of the first top surface 1411) protruding closer to the gas path surface 25a toward the leading edge 23a. Thus, with the upstream end 180b of the trailing edge end portion passage 180 connected to the end portion at the outer side, in the radial direction, of the circumferential-direction passage 130 (in the vicinity of the top surface 1411), it is possible to position the trailing edge end portion passage 180 closer to the gas path surface 25a, and position the upstream end 180b of the trailing edge end portion passage 180 closer to the leading edge 23a. Thus, it is possible to efficiently cool the region of the inner shroud 25 close to the gas path surface 25a at the connection position of the trailing-edge side retainer 63 with the cooling air CA flowing through the plurality of the trailing edge end portion passages 180 arranged in the circumferential direction at the trailing edge end portion 254.

In the stator vane 21 according to some embodiments, as depicted in FIG. 6, the position, in the vane height direction, of the upstream end 180b where the trailing edge end portion passage 180 connects to the circumferential-direction passage 130 is closer to the side of the gas path surface 25a with respect to the center position, in the vane height direction, of the circumferential-direction end portion passages 150, 151.

Accordingly, it is possible to position the trailing edge end portion passage 180 closer to the gas path surface 25a, and thus it is possible to efficiently cool the region of the inner shroud 25 close to the gas path surface 25a at the connection position of the trailing-edge side retainer 63 with the cooling air CA flowing through the plurality of the trailing edge end portion passages 180 arranged in the circumferential direction at the trailing edge end portion 254.

In the stator vane 21 according to some embodiments, as depicted in FIG. 6, the center passage 140 may include the first center passage 1410 and the second center passage 1420 formed at the side of the gas path surface 25a. The second center passage 1420 is formed at the inner side, in the vane height direction, of the gas path surface 25a from the first center passage 1410, and includes an opening portion 145 which is in communication with the first center passage 1410 and which is formed in a range from the trailing-edge side end surface 63a of the trailing-edge side retainer 63 to the trailing-edge side lower end surface 254b of the trailing edge end portion 254.

The axial-direction passage width W1 of the first center passage 1410 is formed to be smaller than the axial-direction passage width W3 of the second center passage 1420. Furthermore, the position, in the axial direction, of the leading edge end of the first top surface 1411 of the first center passage 1410 at the side of the gas path surface 25a is closer to the side of the leading edge 23a than the connection opening 1422 at the connection position between the second center passage 1420 and the first center passage 1410.

Thus, the trailing-edge side lateral surface 1417 at the side of the trailing edge 23b facing, in the axial direction Da, the leading-edge side lateral surface 1415 at the side of the leading edge 23a in the axial direction Da of the first center passage 1410 is positioned at the side of the leading edge 23a, in the axial direction Da, of the second center passage 1420, and at the side of the leading edge 23a with respect to the leading-edge side end surface 1425 at the side of the leading edge 23a with respect to the trailing-edge side retainer 63. Thus, by connecting the upstream end 180b of the trailing edge end portion passage 180 to the first center passage 1410, it is possible to position the upstream end 180b of the trailing edge end portion passage 180 closer to the side of the leading edge 23a. Thus, it is possible to efficiently cool the region of the inner shroud 25 close to the gas path surface 25a at the connection position of the trailing-edge side retainer 63 with the cooling air CA flowing through the plurality of the trailing edge end portion passages 180 arranged in the circumferential direction at the trailing edge end portion 254.

Figure 7:
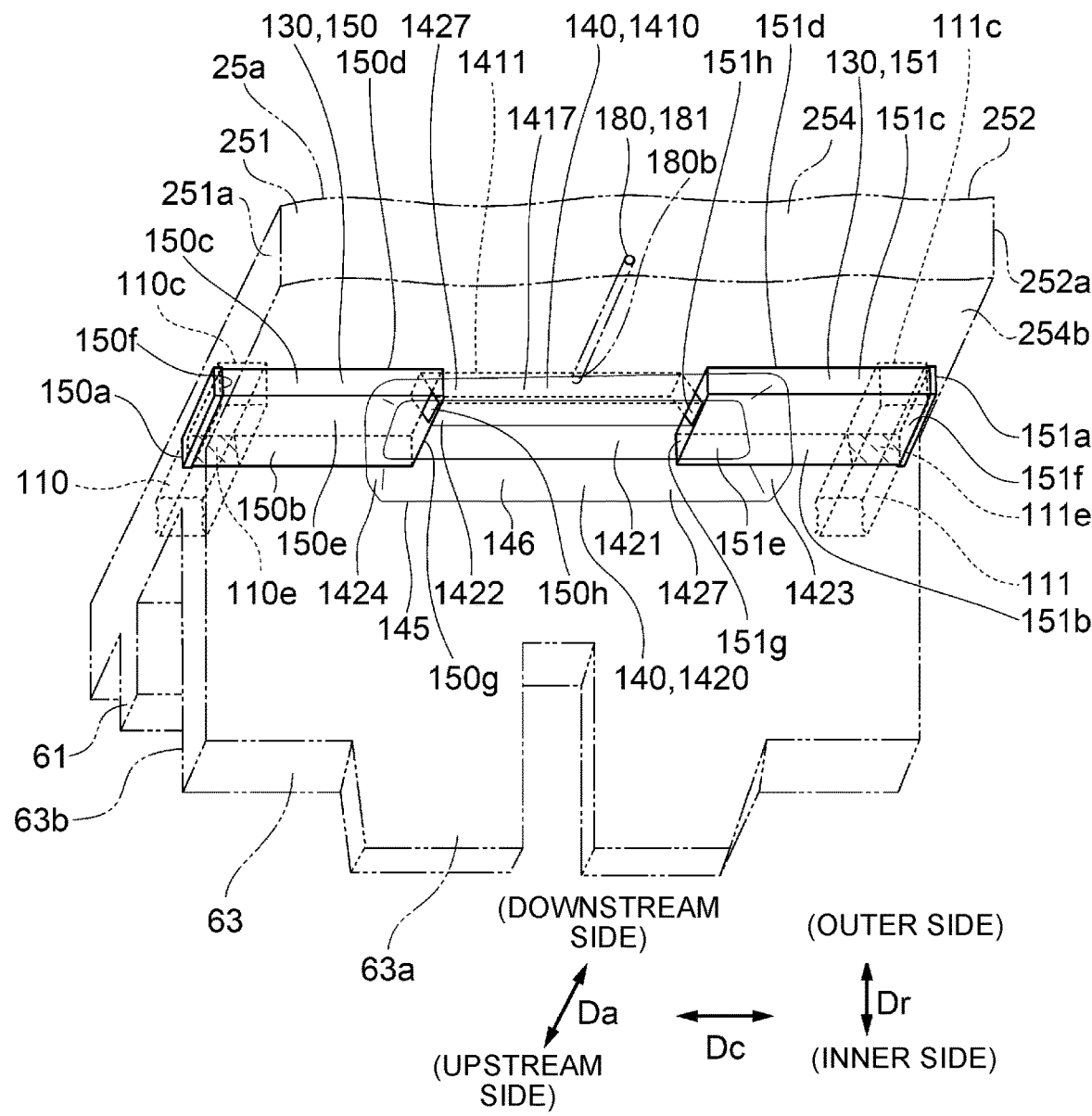
FIG. 7 is a perspective view of the circumferential-direction passage as seen in the direction D in FIG. 6.

Herein, the structure of the center passage 140 and the circumferential-direction end portion passages 150, 151 constituting the circumferential-direction passage 130 and the structure of the joint portion to the lateral portion passages 110, 111 will be described specifically, referring to FIGS. 5 to 7. FIG. 7 is a perspective view of the circumferential-direction passage 130 and a part of the lateral portion passages 110, 111 as seen in the direction D in FIG. 6.

As depicted in FIGS. 5 to 7, the circumferential-direction passage 130 includes the center passage 140 and the circumferential-direction end portion passages 150, 151. The center passage 140 is formed in the middle portion, in the circumferential direction, of the circumferential-direction passage 130. Each of the one end portions, at the side of the center passage 140, of the circumferential-direction end portion passages 150, 151 is connected to the end portion 140a (see FIG. 4), in the circumferential direction Dc, of the center passage 140. Each of the other end portions of the circumferential-direction end portion passages 150, 151 is connected to the lateral portion passage 110 disposed at the lateral end portions 251, 252 of the inner shroud 25. Described below is the reason why the circumferential-direction passage 130 is formed of at least a plurality of passages (in the present embodiment, the center passage 140 and the two circumferential-direction end portion passages 150, 151) instead of a single passage formed between the lateral end portion 251 and the lateral end portion 252 of the inner shroud 25.

As depicted in FIGS. 2 to 7, the airfoil portion 23 of the stator vane 21 receives gas pressure from the combustion gas in a direction downstream in the axial direction, and thus the trailing-edge side retainer 63 being a protruding portion that protrudes inward in the radial direction from the inner shroud 25 receives a reaction force of the gas pressure in the axial direction. Thus, the trailing-edge side retainer 63 is required to have the rigidness as a strength member, and to have a structure having some plate thickness in the axial direction. Meanwhile, the axial-direction passage width of the circumferential-direction passage 130 formed at a position of the trailing-edge side retainer 63 proximate to the gas path surface 25a is nearly equal to the passage width W1 of the first center passage 1410, and relatively small compared to the thickness 't', in the axial direction, of the trailing-edge side retainer 63.

The methods of forming the circumferential-direction passage 130 in the trailing-edge side retainer 63 includes casting. However, as described above, the passage cross-sectional area of the circumferential-direction passage 130 is small compared to the thickness of the trailing-edge side retainer 63, and thus the core used in casting has a risk of breaking, which may make it difficult to carry out casting. Thus, in the present embodiment, as a processing method, instead of casting, electro-discharge machining or machine processing is applied to form the circumferential-direction passage 130. While the producing method according to the present embodiment will be descried below specifically, the opening portion 145 having an elongated rectangular shape in the circumferential direction is formed on the trailing-edge side end surface 63a of the trailing-edge side retainer 63 and the trailing-edge side lower end surface 254b of the trailing edge end portion 254, along the trailing-edge side end surface 63a and the trailing-edge side lower end surface 254b of the trailing edge end portion 254. The passage cross section of the circumferential-direction passage 130 is formed from the opening portion 145 in a direction in which the gas path surface 25a where the trailing-edge side retainer 63 and the airfoil portion 23 connects intersects with the leading-edge side end surface 63b of the trailing-edge side retainer 63.

However, when carrying out the processing only by electro-discharge machining and machine processing from the opening portion 145, the capacity of the second center passage 1420 is considerably large compared to the first center passage 1410, and a long processing time is required. Thus, in the present embodiment, the circumferential-direction passage 130 is formed by combining casting and electro-discharge machining or machine processing. That is, the center passage 140 forming the middle portion of the circumferential-direction passage 130 as described above is formed of the second center passage 1420 formed by casting at the inner side in the radial direction, and the first center passage 1410 formed by electro-discharge processing at the outer side of the second center passage 1420 in the radial direction. The first center passage 1410 has a passage cross section which extends toward the gas path surface 25a in an oblique manner with respect to the direction toward the leading edge 23a. By combining the above two processing methods, the processing time can be shortened.

Meanwhile, when the rigidness of the trailing-edge side retainer 63 is concerned, it is not desirable to form the circumferential-direction passage 130 by extending the structure of the center passage 140 formed by a combination of the above described electro-discharge processing or machine processing and casting to the end surfaces 251a, 252a of the lateral end portions 251, 252 in the circumferential direction. That is, using the above processing method to form the opening portion 145 having an opening on the trailing-edge side end surface 63a of the trailing-edge side retainer 63 from the end surface 251a of the lateral end portion 251 to the end surface 252a of the lateral end portion 252 is not desirable for the trailing-edge side retainer 63 required to have some rigidness, in view of the strength. Accordingly, it is desirable to form a joint passage formed of a through hole in the circumferential direction that maintains the required strength inside the trailing-edge side retainer 63, without providing an opening on any of the trailing-edge side end surface 63a or the leading-edge side end surface 63b, as a passage that connects the end portion 140a of the center passage 140 forming the middle part of the circumferential-direction passage 130 and the lateral portion passages 110, 111 of the lateral end portions 251, 252.

FIG. 7 is a perspective view of the circumferential-direction passage 130 as seen in the direction D in FIG. 6. The structure other than the lateral portion passages 110, 111 and the circumferential-direction passage 130 is depicted in virtual lines. Furthermore, the circumferential-direction passage 130 is depicted in solid lines (partially dotted lines), and the lateral portion passages 110, 111 are depicted in dotted lines.

As depicted in FIGS. 6 and 7, the circumferential-direction end portion passages 150, 151 are formed at the opposite sides, in the circumferential direction, of a hollow portion 146 (second center passage 1420) which forms a part of the center passage 140. As described above, at the position, in the circumferential direction, of the circumferential-direction end portion passages 150, 151, there is no opening on either end surface of the trailing-edge side end surface 63a and the leading-edge side end surface 63b of the trailing-edge side retainer 63. That is, between the circumferential-direction end surfaces 1423, 1424 of the second center passage 1420 and the circumferential-direction end surfaces 251a, 252a of the inner shroud 25, only the circumferential-direction end portion passages 150, 151 are formed through the inside of the trailing-edge side retainer 63 in the circumferential direction, and no opening is formed on the trailing-edge side end surface 63a nor the leading-edge side end surface 63b of the trailing-edge side retainer 63. To ensure the rigidity required for the trailing-edge side retainer 63, between the middle part of the trailing-edge side retainer 63 and the end surfaces 251a, 252a of the inner shroud 25, an opening that directly connects to the outer surface of the trailing-edge side retainer 63 at the side of the leading edge 23a and at the side of the trailing edge 23b is not provided, but the circumferential-direction end portion passages 150, 151 are formed through the inside of the trailing-edge side retainer 63 in the circumferential direction. The circumferential-direction end portion passages 150, 151 are connection passages that form a part of the circumferential-direction passage 130 while maintaining the rigidity of the trailing-edge side retainer 63.

The lateral portion passages 110, 111 may be formed by any of casting, electro-discharge machining, or machine processing. Thus, by forming the lateral portion passages 110, 111 at the lateral end portions 251, 252 and then forming the circumferential-direction end portion passages 150, 151 such that the vicinity of the trailing edge end surfaces 110b, 111b of the lateral portion passages 110, 111 and the circumferential-direction end portion passages 150, 151 overlap in a cross-sectional view as seen in the radial direction, it is possible to join the lateral portion passages 110, 111 and the circumferential-direction end portion passages 150, 151 and the center passage 140 in one processing. When processing the circumferential-direction end portion passages 150, 151, a passage extending in the circumferential direction from the side of the end surfaces 251a, 252a of the lateral end portions 251, 252 to the center passage 140 (first center passage 1410) is formed. That is, the pair of circumferential-direction end portion passages 150, 151 also has the function of the connection passage formed by a different processing procedure from the center passage 140 and the lateral portion passages 110, 111. Furthermore, the connection passage may be applied not only to a case where passages (lateral portion passages 110, 111 and the center passage 1410) are connected as in the present embodiment, but also to a case where one of the passages is a space.

The structure will be described more specifically referring to FIGS. 5 to 7. The second center passage 1420 constituting a part of the center passage 140 is formed as a hollow portion 146 which includes the opening portion 145 formed from the trailing-edge side end surface 63a of the trailing-edge side retainer 63 to the trailing-edge side lower end surface 254b, and which extends in the circumferential direction and the direction of the leading edge 23a. The opening portion 145 has a lid portion 29 fixed thereon by welding, and thereby closed. The opening portion 145 of the hollow portion 146 is formed over the trailing-edge side end surface 63a and the trailing-edge side lower end surface 254b. The hollow portion 146 is a space surrounded by the leading-edge side end surface 1425, the trailing-edge side end surface 1427, the second top surface 1421 proximate to the gas path surface 25a, and the circumferential-direction end surfaces 1423, 1424 formed on opposite ends, in the circumferential direction, of the second center passage 1420. A connection opening 1422 connecting to the first center passage 1410 is disposed on the second top surface 1421 at the upper end, in the radial direction, of the hollow portion 146, at the side of the leading edge 23a.

From the connection opening 1422, the first center passage 1410 is formed so as to extend outward in the radial direction and in the direction of the leading edge 23a. The first center passage 1410 is a flat-plate shaped passage extending in the circumferential direction, formed by a leading-edge side lateral surface 1415 and a trailing-edge side lateral surface 1417 extending in the circumferential direction and facing in the axial direction. The outer end, in the radial direction, of the first center passage 140 is a terminating end of processing by electro-discharge machining, and is closed by the first top surface 1411. The trailing-edge side lateral surface 1417 is a position where the upstream end 180b of the trailing edge end portion passage 180 connects, and the trailing edge end portion passage 180 has an opening on the trailing-edge side lateral surface 1417. To enhance cooling of the trailing-edge side retainer 63 in the vicinity of the gas path surface 25a where the trailing-edge side retainer 63 and the airfoil portion 23 connect to one another, it is desirable to position the trailing-edge side lateral surface 1417 as close as possible to the leading edge 23a, and have a long length of overlap between the trailing edge end portion passage 180 and the trailing-edge side retainer 63 as seen in the radial direction. The connection opening 1422 connects to the first center passage 1410, and is a starting position of processing for forming the first center passage 1410 by electro-discharge machining.

Next, the positional relationship of the first center passage 1410, the circumferential-direction end portion passages 150, 151, and the lateral portion passages 110, 111 will be described. As depicted in FIG. 5, the radial-direction height of the leading-edge side end surfaces 150b, 151b of the circumferential-direction end portion passages 150, 151 at the position where the lateral portion passages 110, 111 connect to the circumferential-direction end portion passages 150, 151 should be desirably not smaller than the radial-direction height of the lateral portion passages 110, 111. Furthermore, the position of the upper top surfaces 150d, 151d, at the outer side in the radial direction, forming a passage cross section of the circumferential-direction end portion passages 150, 151 should be desirably at the same position or higher than the upper surfaces 110c, 111c of the lateral portion passages 110, 111, and closer to the gas path surface 25a than the upper surfaces 110c, 111c. After processing the lateral portion passages 110, 111, when carrying out the electro-discharge machining of the circumferential-direction end portion passages 150, 151 as connection passages, the entire area of the passage cross section of the lateral portion passages 110, 111 is formed through the leading-edge side end surfaces 150b, 151b of the circumferential-direction end portion passages 150, 151. As a result, it is possible to ensure a sufficient passage cross-sectional area for the connection openings 110e, 111e formed at the connection position of the lateral portion passages 110, 111 and the circumferential-direction end portion passages 150, 151, and suppress generation of excessive pressure loss of cooling air at the connection openings 110e, 111e.

Furthermore, as depicted in FIGS. 5 to 7, the circumferential-direction inner end portions 150g, 151g at the opposite side, in the circumferential direction, to the circumferential-direction outer end portions 150f, 151f where the circumferential-direction end portion passages 150, 151 connect to the lateral portion passages 110, 111 connect to the first center passage 1410. With regard to the positional relationship, in the radial direction, between the first center passage 140 and the circumferential-direction end portion passages 150, 151, the position, in the radial direction Dr, of the first top surface 1411 of the first center passage 1410 should be desirably formed at the same height, or at somewhat the outer side, in the radial direction, of the position, in the radial direction Dr, of the upper top surfaces 150d, 151d of the circumferential-direction end portion passages 150, 151, and further closer to the gas path surface 25a. When it is possible to have the position, in the radial direction Dr, of the first top surface 1411 of the first center passage 1410 proximate to the gas path surface 25a, it is possible to have the position, in the radial direction, of the trailing edge end portion passage 180 connecting to the first center passage 1410 proximate to the gas path surface 25a, and enhance cooling of the lower part of the trailing-edge side retainer 63 (the connection end where the trailing-edge side retainer 63 connects to the inner shroud 25).

Furthermore, as depicted in FIGS. 5 and 6, with regard to the positional relationship, in the axial direction (leading edge to trailing edge direction), between the first center passage 1410 and the circumferential-direction end portion passages 150, 151, the position of the leading-edge side end surfaces 150b, 151b of the circumferential-direction end portion passages 150, 151 should be desirably as close as possible to the leading edge end surface 1413a of the first top surface 1411 of the first center passage 1410 and the leading-edge side end surface 63b of the trailing-edge side retainer 63. Meanwhile, when the strength of the trailing-edge side retainer is concerned, it is necessary to provide some distance between the leading-edge side end surfaces 150b, 151b of the circumferential-direction end portion passages 150, 151 and the leading-edge side end surface 63b of the trailing-edge side retainer 63 to maintain the minimum plate thickness. Thus, the position of the leading-edge side end surfaces 150b, 151b of the circumferential-direction end portion passages 150, 151 should be desirably formed at the downstream side (the side of the trailing edge 23b), in the axial direction, as close as possible to the leading-edge side end surface 63b of the trailing-edge side retainer 63, within a range a predetermined plate thickness required in view of the strength is maintained.

The passage cross-sectional area of the circumferential-direction end portion passages 150, 151 should be desirably greater than the passage cross-sectional area of the lateral portion passages 110, 111 at the upstream side of the flow direction of cooling air. Meanwhile, the circumferential-direction end portion passages 150, 151 have a rectangular cross-sectional shape surrounded by the following four surfaces: leading-edge side end surfaces 150b, 151b, trailing-edge side end surfaces 150c, 151c, upper top surfaces 150d, 151d, and bottom surfaces 150e, 151e. As described above, the circumferential-direction end portion passages 150, 151 are formed through the end surfaces 251a, 252a of the lateral end portions 251, 252, and thus the height, in the radial direction, of the rectangular cross section is limited to the height that is substantially the same as the passage height of the lateral portion passages 110, 111. Meanwhile, the minimum required passage width of the axial-direction passage width W2 of the circumferential-direction end portion passages 150, 111 having a rectangular shape is determined by the larger passage width of a passage width determined by the passage cross-sectional area of the circumferential-direction end portion passages 150, 151 or the axial-direction passage width W1 of the first center passage 1410. Thus, in order to reduce pressure loss of cooling air, the axial-direction passage width W2 of the circumferential-direction end portion passages 150, 151 should be a passage width that is at least not smaller than twice the axial-direction passage width W1, such that the passage cross-sectional area of the circumferential-direction end portion passages 150, 151 is greater than the cross-sectional area of the lateral portion passages 110, 111.

As depicted in FIG. 7, the cooling air CA supplied to the lateral portion passages 110, 111 flows into the circumferential-direction end portion passages 150, 151 via the connection openings 110e, 111e formed on the leading-edge side end surfaces 150b, 151b of the circumferential-direction end portion passages 150, 151 where the lateral portion passages 110, 111 connect to the circumferential-direction end portion passages 150, 151. Furthermore, connection openings 150h, 151h where the first center passage 1410 connects to the circumferential-direction end portion passages 150, 151 are formed on the circumferential-direction inner end portions 150g, 151g of the circumferential-direction end portion passages 150, 151 where the first center passage 1410 connects to the circumferential-direction end portion passages 150, 151. The cooling air CA supplied to the circumferential-direction end portion passages 150, 151 is supplied to the first center passage 1410 via the connection openings 150h, 151h. In the drawing, the first center passage 1410 extending in the direction of the leading edge 23a and outward in the radial direction from the connection opening 1422 of the second center passage 1420 is depicted in dotted lines, and the first center passage 1410 connects to the circumferential-direction end portion passages 150, 151 via the connection openings 150h, 151h.

As described above, the circumferential-direction end portion passages 150, 151 are not disposed at the middle part of the circumferential-direction passage 130 positioned at the trailing edge end portion 254 of the inner shroud 25, but at the opposite end portions, in the circumferential direction, of the circumferential-direction passage 130 that connect to the lateral end portions 251, 252. Thus, the circumferential-direction end portion passages 150, 151 do not have any opening on the trailing-edge side end surface 63a nor the leading-edge side end surface 63b of the trailing-edge side retainer 63, and are formed as passages extending through the trailing-edge side retainer 63 in the circumferential direction Dc, which makes it possible to maintain the rigidity required for the trailing-edge side retainer 63.

Furthermore, the trailing-edge side end surface (trailing-edge side lateral surface 1417) at the outer side, in the radial direction, where the center passage 140 connecting to the trailing edge end portion passages 180 is proximate to the gas path surface 25a, is positioned closer to the side of the leading edge 23a than the position, in the axial direction Da, of the trailing-edge side end surface 63a of the trailing-edge side retainer 63. Furthermore, when the center passage 140 is seen in the circumferential direction Dc, the position, in the axial direction Da, of the center passage 140 is at the side of the leading edge 23a with respect to the position, in the axial direction Da, of the trailing-edge side end surface 63a of the trailing-edge side retainer 63. In particular, the center passage (first center passage 1410) connecting to the trailing edge end portion passages 180 forms an oblique passage that is oblique toward the side of the leading edge 23a and proximate to the leading edge 23a, the oblique passage also being proximate to the gas path surface 25a, and is disposed proximate to the side of the leading edge 23a with respect to the second center passage 1420 being a part of the center passage 140. Thus, the position, in the axial direction Da, of the center passage (first center passage 1410) is positioned at the side of the leading edge 23a with respect to the position, in the axial direction Da, of the trailing-edge side end surface 63a of the trailing-edge side retainer 63, which is effective in cooling the inner shroud 25 at the side of the leading edge 23a proximate to the position where the trailing-edge side retainer 63 connects to the inner shroud 25. Thus, in a cross-sectional view as seen in the radial direction Dr, the trailing-edge side retainer 63 and the trailing edge end portion passage 180 are positioned so as to overlap with one another, and thus the root of the trailing-edge side retainer 63, that is, the position where the trailing-edge side retainer 63 connects to the inner shroud 25 is cooled efficiently by the trailing edge end portion passages 180, whereby the reliability of the vane is improved.

In the stator vane 21 according to some embodiments, the plurality of trailing edge end portion passages 180 arranged in the circumferential direction include a first trailing edge end portion passage 181 and a second trailing edge end portion passage 182. The first trailing edge end portion passage 181 has an upstream end 180b connected to the first center passage 1410, and the trailing edge end surface 254a has an opening on the trailing edge end surface 25c of the inner shroud 25. The second trailing edge end portion passage 182 has an upstream end 180b connected to at least one of the circumferential-direction end portion passages 150, 151, and the trailing edge end surface 254a has an opening on the trailing edge end surface 25c of the inner shroud 25.

As described above, the trailing-edge side lateral surface 1417 of the first center passage 1410 is positioned at the side of the leading edge 23a with respect to the trailing-edge side end surface 1427 of the second center passage 1420. Furthermore, the upstream end 180b of the first trailing edge end portion passage 181 is connected to the first center passage 1410, and thus it is possible to position the upstream end 180b being an upstream end position of the first trailing edge end portion passage 181 closer to the side of the leading edge 23a. Accordingly, it is possible to efficiently cool the region of the inner shroud 25 close to the gas path surface 25a at the connection position of the retainer 63 with the cooling air CA flowing through the plurality of the trailing edge end portion passages 180 (first trailing edge end portion passages 181) arranged in the circumferential direction Dc at the trailing edge end portion 254.

Furthermore, in the stator vane 21 according to some embodiments, the upstream end 180b of the second trailing edge end portion passage 182 is connected to at least one of the circumferential-direction end portion passages 150, 151, and thus it is possible to cool the region at the opposite end sides, in the circumferential direction Dc, of the inner shroud 25 efficiently with the cooling air CA flowing through the second trailing edge end portion passage 182.

In the vane 21 according to some embodiments, the opening portion 145 of the second center passage 1420 may extend between the trailing-edge side end surface 63a of the retainer 63 and the trailing-edge side lower end surface 254b opposite to the airfoil portion 23 across the gas path surface 25a of the inner shroud 25.

In the stator vane 21 according to some embodiments, as described above, the shroud 2 includes the space portion 257, the impingement space 256, and the lateral portion passages 110, 111.

Accordingly, by providing the cooling air CA to the lateral portion passages 110, 111 via the impingement space 256 from the space portion 257, it is possible to cool the region in the vicinity of the lateral end portions 251, 252, in the circumferential direction Dc, of the inner shroud 25, from the side of the leading edge 23a toward the side of the trailing edge 23b.

While the air passage 100 of the inner shroud 25 is described in the above description, an air passage of the outer shroud 25 may have a similar configuration to that of the air passage 100 of the inner shroud 25. In this way, it is possible to improve the cooling effect for each of the inner shroud 25 and the outer shroud 27.

The gas turbine 10 according to an embodiment described above includes the stator vane 21 according to some embodiments, and thus it is possible to improve the effect to cool the shroud 2 of the stator vane 21. Accordingly, it is possible to contribute to improvement of the durability of the gas turbine 10.

(Method of Producing the Stator Vane 21)

Hereinafter, the method of producing the stator vane 21 according to some embodiments described above will be described. As described above, in some embodiments, the method of producing the stator vane 21 includes casting, and electro-discharge machining or machine processing.

Figure 8:
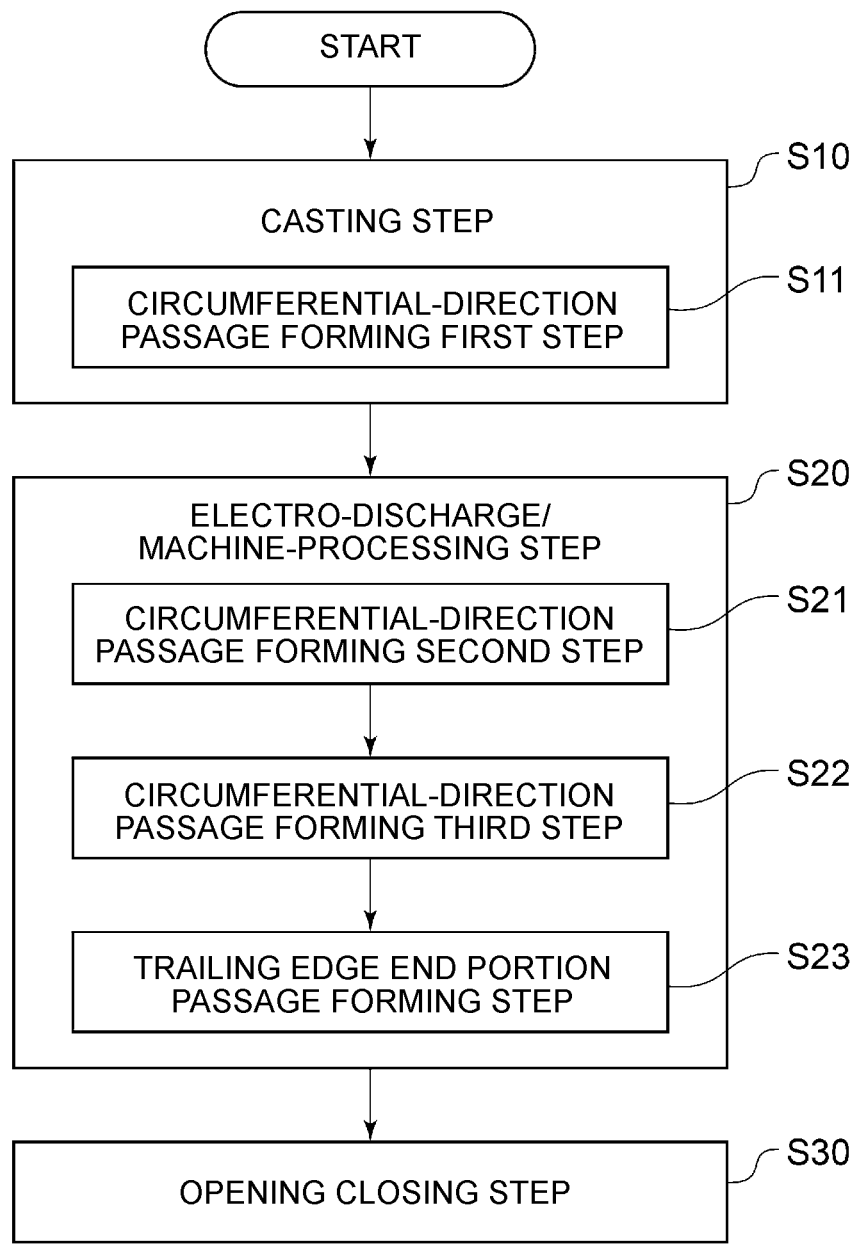
FIG. 8 is a flowchart showing the procedures of a method of producing a stator vane according to some embodiments.

FIG. 8 is a flowchart showing a process of a method of producing the stator vane 21 according to some embodiments. According to some embodiments, the method of producing the stator vane 21 includes a casting step S10, an electro-discharge/machine-processing step S20, and an opening closing step S30.

The casting step S10 is a step of forming, by casting, a stator vane 21 which includes the airfoil portion 23, the inner shroud 25, and the outer shroud 27 formed integrally. In the casting step S10 according to some embodiments, of the above described passages, the lateral portion passages 110, 111, and the second center passage 1420 including the opening portion 145 are formed by casting. That is, the casting step S10 according to some embodiments includes a first step of forming, by casting, the second center passage 1420 being a part of the circumferential-direction passage 130 (circumferential-direction passage forming first step S11).

It should be noted that the lateral portion passages 110, 111 may not necessarily be formed in the casting step S10, and may be formed in the electro-discharge/machining-processing step S20 described below.

The electro-discharge/machining-processing step S20 is a step of forming, by performing electro-discharge machining or machine processing on the stator vane 21 formed in the casting step S10, the first center passage 1410, the circumferential-direction end portion passages 150, 151, and the trailing edge end portion passages 180. That is, the electro-discharge/machining-processing step S20 according to some embodiments includes, after forming the second center passage 1420 by casting in the circumferential-direction passage forming first step S11: a second step of forming, by electro-discharge machining or machine processing, the first center passage 1410 being a non-processed part of the circumferential-direction passage 130 (circumferential-direction passage forming second step S21); and a third step of forming, by electro-discharge machining or machine processing, the circumferential-direction end portion passages 150, 151 (circumferential-direction end portion passage forming third step S22). Furthermore, the electro-discharge/machining-processing step S20 according to some embodiments includes a trailing edge end portion passage forming step S23 of forming the trailing edge end portion passages 180.

In the circumferential-direction passage forming second step S21, the first center passage 140 is formed by inserting an electrode for electro-discharge machining or a tool for machine processing or the like into the hollow portion 146 from the opening portion 145 of the second center passage 1420, moving the electrode or the tool or the like obliquely in the direction of the leading edge 23a toward the gas path surface 25a, and moving the same in the circumferential direction Dc.

In the circumferential-direction passage forming third step S22, after completing the processing of the circumferential-direction passage forming second step S21, one of the circumferential-direction end portion passages 150, 151, that is, the circumferential-direction end portion passage 150 is formed by moving the electrode for electro-discharge machining or the tool for machine processing or the like to one end portion of the first center passage 1410, from the end surface 251a of the lateral end portion 251 at one side (the side of the pressure-side vane surface 23c), in the circumferential direction Dc, of the inner shroud 25 toward the lateral end portion 252 at the other side (the side of the suction-side vane surface 23d).

Similarly, in the circumferential-direction passage forming third step S22, the other one of the circumferential-direction end portion passages 151, 151, that is, the circumferential-direction end portion passage 151 is formed, by moving the electrode for electro-discharge machining to the other end portion of the first center passage 1410, from the end surface 252a of the lateral end portion 252 at the other side (the side of the suction-side vane surface 23d) toward the lateral end portion 251 at the one side (the side of the pressure-side vane surface 23c).

As described above, in the method of producing the stator vane 21 according to some embodiments, the step of forming the circumferential-direction passage 130 for the inner shroud 25 includes the circumferential-direction passage forming first step S11, the circumferential-direction passage forming second step S21, and the circumferential-direction passage forming third step S22.

In the trailing edge end portion passage forming step S23, the trailing edge end portion passages 180 are formed by moving the electrode for electro-discharge machining or the tool for machine processing or the like from the trailing edge end surface 25c of the inner shroud 25 to the trailing-edge side lateral surface 1417 of the first center passage 1410 toward the leading edge 23a.

The opening closing step S30 is a step of closing the opening portion 145 of the second center passage 1420, or an opening formed on the end surfaces 251a, 252a of the lateral end portions 251, 252 by electro-discharge machining or machine processing in the circumferential-direction passage forming third step S22. In the opening closing step S30 according to some embodiments, the opening portion 145 of the second center passage 1420 is closed by fixing a lid portion 29 thereon by welding. Furthermore, in the opening closing step S30 according to some embodiments, the openings formed on the end surfaces 251a, 252a of the lateral end portions 251, 252 by electro-discharge machining or machine processing in the circumferential-direction passage forming third step S22 are closed by fixing passage lids 150a, 151a thereon by welding.

According to the method of producing the stator vane 21 according to some embodiments, the trailing edge end portion passage 180 is formed such that, the position, in the axial direction, of the upstream end 180b where the trailing edge end portion passage 180 connects to the first center passage 1410 is positioned at the side of the leading edge 23a with respect to the position of the trailing-edge side end surface 63a of the trailing-edge side retainer 63 at the position where the trailing-edge side retainer 63 being a protruding portion connects to the inner shroud 25. Thus, it is possible to efficiently cool the region of the inner shroud 25 close to the gas path surface 25a at the connection position of the inner shroud 25 and the trailing-edge side retainer 63 with the cooling air flowing through the plurality of the trailing edge end portion passages 180 arranged in the circumferential direction at the trailing edge end portion 254. Thus, it is possible to suppress temperature increase of the region compared to the rest of the region, and improve the effect to cool the inner shroud 25 of the stator vane 21.

Furthermore, according to the method of producing the stator vane 21 according to some embodiments, the center passage 140 included in the circumferential-direction passage 130 has an opening portion 145 formed on the trailing-edge side end surface 63a of the retainer 63. Furthermore, the center passage 140 has, in a cross-sectional view as seen in the circumferential direction, an end portion at the outer side in the radial direction (first top surface 1411) protruding closer to the gas path surface 25a toward the side of the leading edge 23a, and an end portion at the inner side in the radial direction formed at the side of the trailing edge 23b with respect to the end portion at the outer side in the radial direction (the top surface 1411). Thus, for instance, in a case where the stator vane 21 is produced by casting, it is possible to facilitate integral fabrication of, in the course of casting of the stator vane 21, the opening portion 145 on the trailing-edge side end surface 63a of the trailing-edge side retainer 63, and the second center passage 1420 being at least a part of the center passage 140 connecting to the opening portion 145. Accordingly, it is possible to suppress the production cost of the stator vane 21.

The characteristics of the producing method in each step will be described below.

As described above, it is difficult to form the circumferential-direction passage 130 on the trailing-edge side retainer 63 by casting, and forming the circumferential-direction passage 130 by electro-discharge machining or machine processing requires a long processing time and is disadvantageous in terms of costs. Thus, in the present embodiment, in the circumferential-direction passage forming first step S11, the second center passage 1420 being a part of the circumferential-direction passage 130 is formed by casting. Furthermore, in the circumferential-direction passage forming second step S21, the first center passage 1410 being a part of the circumferential-direction passage 130 is formed by electro-discharge machining or machine processing. Furthermore, in the circumferential-direction passage forming third step S22, the circumferential-direction end portion passages 150, 151 being a part of the circumferential-direction passage 130 are formed by electro-discharge machining or machine processing. Furthermore, in the trailing edge end portion passage forming step S23, the trailing edge end portion passage 180 is formed by electro-discharge machining or machine processing.

In the present embodiment, the position of the first center passage 1410 constituting a part of the circumferential-direction passage 130 requires a predetermined processing accuracy. That is, the position of the upstream end 180b where the trailing edge end portion passage 180 connects to the trailing-edge side lateral surface 1417 of the first center passage 1410 at the upstream side in the axial direction should be desirably positioned as upstream as possible in the axial direction with respect to the trailing-edge side end surface 63a of the trailing-edge side retainer 63, and the first top surface 1411 at the outer side, in the radial direction Dr, of the first center passage 1410 should be desirably formed as proximate as possible to the gas path surface 25a. Thus, when processing the first center passage 1410, a predetermined processing accuracy is required, and it is desirable to form the first center passage 1410 by machine processing or electro-discharge machining.

The trailing edge end portion passages 180 have a structure that includes a plurality of cooling holes 180a arranged in the circumferential direction, and it is desirable to form the hole diameter and the arrangement pitch, for instance, of the cooling holes 180a accurately in order to maintain a uniform metal temperature distribution in the circumferential direction of the trailing-edge side retainer 63 at the connection position to the inner shroud 25. Thus, a predetermined processing accuracy is required, and it is desirable to form the trailing edge end portion passages 180 by machine processing or electro-discharge machining.

On the other hand, the second center passage 1420 is not required to have a high machining accuracy compared to the first center passage 140. Nevertheless, the hollow portion 146 has a great capacity, and thus a broad processing range and a large processing capacity. Thus, by forming the second center passage 1420 by casting, it is possible to shorten the processing time.

Furthermore, according to the method of producing the stator vane 21 according to some embodiments, a part of the circumferential-direction passage 130 can be formed by casting, and thus it is possible to lessen the parts to be formed by electro-discharge machining or machine processing, and suppress the production costs of the stator vane 21. According to the method of producing the stator vane 21 according to the present embodiment, by combining casting and electro-discharge machining or machine processing, it is possible to process the stator vane 21 easily, and suppress the processing costs.

Embodiments of the present invention were described in detail above, but the present invention is not limited thereto, and various amendments and modifications may be implemented.

REFERENCE SIGNS LIST

2 Shroud
10 Gas turbine
21 Turbine stator vane (stator vane)
23 Airfoil portion
23a Leading edge
23b Trailing edge
23c Pressure-side vane surface
23d Suction-side vane surface
23e Tip end portion
23f Root end portion
25 Inner shroud
25a Gas path surface
25c Trailing edge end surface
27 Outer shroud
29 Lid portion
61 Leading-edge side retainer
63 Trailing-edge side retainer (protruding portion)
63a Trailing-edge side end surface
63b Leading-edge side end surface
70 Impingement plate
71 Through hole
100 Air passage
110, 111 Lateral portion passage
110a, 111a Leading edge end surface
110b, 111b Trailing edge end surface
110c, 111c Upper surface
110e, 111e Connection opening
130 Circumferential-direction passage
140 Center passage (oblique passage)
140a End portion
145 Opening portion
146 Hollow portion
150, 151 Circumferential-direction end portion passage
150a, 151a Passage lid
150b, 151b Leading-edge side end surface
150c, 151c Trailing-edge side end surface
150d, 151d Upper top surface
150e, 151e Bottom surface
150f, 151f Circumferential-direction outer end portion
150g, 151g Circumferential-direction inner end portion
150h, 151h Connection opening
180 Trailing edge end portion passage
180a Cooling hole
180b Upstream end (first end portion)
180c Other end portion (second end portion)
181 First trailing edge end portion passage
182 Second trailing edge end portion passage
251, 252 Lateral end portion
251a, 252a Circumferential-direction end surface
253 Leading edge end portion
253a Leading edge end surface
254 Trailing edge end portion
254a Trailing edge end surface
254b Trailing-edge side lower end portion
255 Inner region (space portion)
255a Inner region bottom surface
256 Impingement space
257 Space portion
1410 First center passage
1411 First top surface (third end portion)
1412 Radial-direction inner end portion (fourth end portion)
1415 Leading-edge side lateral surface
1417 Trailing-edge side lateral surface
1420 Second center passage
1421 Second top surface
1422 Connection opening
1423, 1424 Circumferential-direction end surface
1425 Leading-edge side end surface
1427 Trailing-edge side end surface

The invention claimed is:

1. A turbine stator vane, comprising:
   an airfoil portion;
   a shroud disposed on at least one of the side of a tip end portion or the side of a root end portion of the airfoil portion; and
   a protruding portion protruding toward the opposite side to the airfoil portion across a gas path surface in a radial direction,
   wherein the shroud includes:
      a circumferential-direction passage disposed at the side of a trailing edge and extending in a circumferential direction; and
      a plurality of trailing edge end portion passages arranged in the circumferential direction at the side of the trailing edge, each trailing edge end portion passage having a first end portion connected to the circumferential-direction passage and a second end portion having an opening on a trailing edge end surface of the shroud,
   wherein the circumferential-direction passage includes, in a cross-sectional view as seen in the circumferential direction, an oblique passage having a third end portion to protrude closer to the gas path surface toward the side of a leading edge, and a fourth end portion formed at the side of the trailing edge with respect to the third end portion, the oblique passage having an opening portion disposed on a trailing-edge side end surface of the protruding portion and closed by a lid portion, and
   wherein a position, in an axial direction, of the first end portion where each trailing edge end portion passage connects to the circumferential-direction passage is positioned at the side of the leading edge with respect to a position of the trailing-edge side end surface of the protruding portion at a position where the protruding portion connects to the shroud.

2. The turbine stator vane according to claim 1,
   wherein the first end portion of each trailing edge end portion passage is connected to the circumferential-direction passage at an upstream end in the axial direction.

3. The turbine stator vane according to claim 2,
   wherein the circumferential-direction passage includes a center passage having the opening portion and circumferential-direction end portion passages connecting to opposite ends, in the circumferential direction, of the center passage, each circumferential-direction end portion passage extending to an end portion, in the circumferential direction, of the shroud, and
   wherein an axial-direction passage width of the center passage at a position where the trailing edge end portion passages connect to the circumferential-direction passage is formed to be smaller than an axial-direction passage width of the circumferential-direction end portion passages.

4. The turbine stator vane according to claim 1,
   wherein the circumferential-direction passage includes a center passage having the opening portion and circumferential-direction end portion passages connecting to opposite ends, in the circumferential direction, of the center passage, each circumferential-direction end portion passage extending to an end portion, in the circumferential direction, of the shroud, and
   wherein an axial-direction passage width of the center passage at a position where the trailing edge end portion passages connect to the circumferential-direction passage is formed to be smaller than an axial-direction passage width of the circumferential-direction end portion passages.

5. The turbine stator vane according to claim 1,
   wherein the shroud includes:
      a space portion formed by a bottom surface and an outer wall portion extending in a vane height direction from the bottom surface; and
      a lateral portion passage formed on a lateral end portion in the circumferential direction from the side of the leading edge toward the side of the trailing edge, the lateral portion passage having a leading edge end surface being in communication with the space portion and a trailing edge end surface being in communication with the circumferential-direction passage.

6. The turbine stator vane according to claim 1,
   wherein the shroud includes an inner shroud formed at the side of the tip end portion of the airfoil portion and an outer shroud formed at the side of the root end portion of the airfoil portion.

7. A gas turbine comprising the turbine stator vane according to claim 1.

8. A turbine stator vane, comprising:
   an airfoil portion;
   a shroud disposed on at least one of the side of a tip end portion or the side of a root end portion of the airfoil portion; and
   a protruding portion protruding toward an outer side opposite to the airfoil portion across a gas path surface in a radial direction,
   wherein the shroud includes:
      a circumferential-direction passage disposed at the side of a trailing edge and extending in a circumferential direction; and
      a plurality of trailing edge end portion passages arranged in the circumferential direction at the side of the trailing edge, each trailing edge end portion passage having a first end portion connected to the circumferential-direction passage and a second end portion having an opening on a trailing edge end surface of the shroud,
   wherein the circumferential-direction passage includes a center passage, and a plurality of circumferential-direction end portion passages connecting to opposite ends, in the circumferential direction, of the center passage, each circumferential-direction end portion passage extending to an end portion, in the circumferential direction, of the shroud,
   wherein an axial-direction passage width of the center passage at a position where the trailing edge end portion passages connect to the circumferential-direction passage is formed to be smaller than an axial-direction passage width of the circumferential-direction end portion passages, and
   wherein a position, in an axial direction, of the center passage to which the trailing edge end portion passages connect is positioned at the side of the leading edge with respect to a position of the trailing-edge side end surface of the protruding portion at a position where the protruding portion connects to the shroud.

9. The turbine stator vane according to claim 8,
   wherein the center passage includes, in a cross-sectional view as seen in the circumferential direction, an oblique passage having a third end portion to protrude closer to the gas path surface toward the side of the leading edge, and a fourth end portion formed at the side of the trailing edge with respect to the third end portion, the oblique passage having an opening portion disposed on the trailing-edge side end surface of the protruding portion and closed by a lid portion.

10. The turbine stator vane according to claim 8, wherein a position, in a vane height direction, of the first end portion where each trailing edge end portion passage connects to the circumferential-direction passage is more proximate to the gas path surface than a position, in the vane height direction, of the circumferential-direction end portion passages.

11. The turbine stator vane according to claim 8, the center passage includes:
   a first center passage formed at the side of the gas path surface; and
   a second center passage formed at an outer side, in a vane height direction, of the first center passage from the gas path surface, the second center passage being in communication with the first center passage and having an opening portion formed on the trailing-edge side end surface of the protruding portion.

12. The turbine stator vane according to claim 11, wherein an axial-direction passage width of the first center passage is formed to be smaller than an axial-direction passage width of the second center passage, and
   wherein a position, in the axial direction, of an end portion of the first center passage at the side of the gas path surface is positioned at the side of the leading edge with respect to a position, in the axial direction, of the second center passage at a connection position of the second center passage to the first center passage.

13. The turbine stator vane according to claim 12, wherein the plurality of trailing edge end portion passages arranged in the circumferential direction includes:
   a first trailing edge end portion passage having the first end portion connected to the first center passage and the second end portion having an opening on the trailing edge end surface of the shroud; and
   a second trailing edge end portion passage having the first end portion connected to at least one of the circumferential-direction end portion passages and the second end portion having an opening on the trailing edge end surface of the shroud.

14. The turbine stator vane according to claim 11, wherein the opening portion of the second center passage extends from the trailing-edge side end surface of the protruding portion to an end surface of the shroud at an opposite side to the airfoil portion across the gas path surface.

15. The turbine stator vane according to claim 8, wherein the shroud includes:
   a space portion formed by a bottom surface and an outer wall portion extending in a vane height direction from the bottom surface; and
   a lateral portion passage formed on a lateral end portion in the circumferential direction from the side of the leading edge toward the side of the trailing edge, the lateral portion passage having a leading edge end surface being in communication with the space portion and a trailing edge end surface being in communication with the circumferential-direction passage.

16. The turbine stator vane according to claim 8, wherein the shroud includes an inner shroud formed at the side of the tip end portion of the airfoil portion and an outer shroud formed at the side of the root end portion of the airfoil portion.

17. A gas turbine comprising the turbine stator vane according to claim 8.

18. A method of producing a turbine stator vane, wherein the turbine stator vane includes:
   an airfoil portion;
   a shroud disposed on at least one of the side of a tip end portion or the side of a root end portion of the air foil portion; and
   a protruding portion protruding toward an opposite side to the airfoil portion across a gas path surface, and
   wherein the method at least comprises:
   a step of forming, by casting, a second center passage extending in a circumferential direction and having an opening disposed on a trailing-edge side end surface of the protruding portion and closed by a lid portion;
   a step of forming, by electro-discharge machining or machine processing, a first center passage extending in the circumferential direction, the first center passage having, in a cross-sectional view as seen in the circumferential direction, a third end portion protruding closer to the gas path surface toward the leading edge and a fourth end portion being in communication with the second center passage; and
   a step of forming, by the electro-discharge machining or the machine processing, a plurality of trailing edge end portion passages arranged in the circumferential direction at the side of the trailing edge, each trailing edge end portion passage having a first end portion connected to the first center passage and a second end portion having an opening on a trailing edge end surface of the shroud.

19. The method of producing a turbine stator vane according to claim 18, further comprising a step of forming, by electro-discharge machining or machine processing, a circumferential-direction end portion passage connected to the first center passage and disposed between a lateral end portion of the shroud and the first center passage, the circumferential-direction end portion passage extending in the circumferential direction.

* * * * *